US007314097B2

(12) United States Patent
Jenner et al.

(10) Patent No.: US 7,314,097 B2
(45) Date of Patent: Jan. 1, 2008

(54) HAMMER DRILL WITH A MODE CHANGEOVER MECHANISM

(75) Inventors: Cheryl Jenner, Ellicott City, MD (US); Stephen A. Debelius, Phoenix, MD (US); Craig A. Schell, Baltimore, MD (US); Daniel Puzio, Baltimore, MD (US); Warren A. Ceroll, Owings Mills, MD (US); Robert S. Gehret, Hampstead, MD (US); James B. Watson, Fallston, MD (US); Charles E. Yocum, Ellicott City, MD (US); Christopher M. Brock, Bloomfield Hills, MI (US); Michael D. Zalobsky, Clarkston, MI (US)

(73) Assignee: Black & Decker Inc., Newark, DE (US)

( * ) Notice: Subject to any disclaimer, the term of this patent is extended or adjusted under 35 U.S.C. 154(b) by 43 days.

(21) Appl. No.: 11/256,595

(22) Filed: Oct. 21, 2005

(65) Prior Publication Data

US 2006/0201688 A1 Sep. 14, 2006

Related U.S. Application Data

(60) Provisional application No. 60/655,768, filed on Feb. 24, 2005.

(51) Int. Cl.
*B25F 5/00* (2006.01)
*F16H 37/08* (2006.01)

(52) U.S. Cl. ........................ 173/48; 173/178; 173/216; 475/265; 475/298

(58) Field of Classification Search .................. 173/47, 173/48, 178, 216, 217; 475/298, 263, 267, 475/275, 265
See application file for complete search history.

(56) References Cited

U.S. PATENT DOCUMENTS

| | | | |
|---|---|---|---|
| 2,836,272 | A | 6/1958 | Kaman |
| 2,923,191 | A | 2/1960 | Fulop |
| 3,349,651 | A | 10/1967 | Turnbull et al. |
| 3,364,963 | A | 1/1968 | Turnbull |
| 3,550,243 | A | 12/1970 | Allsop |

(Continued)

FOREIGN PATENT DOCUMENTS

| | | |
|---|---|---|
| DE | 1 903 434 | 10/1964 |
| DE | DT 1 478 982 | 1/1970 |
| DE | 29 20 065 C2 | 7/1986 |
| DE | 90 16 415 | 9/1999 |

(Continued)

*Primary Examiner*—Scott A. Smith
(74) *Attorney, Agent, or Firm*—Harness, Dickey & Pierce, P.L.C.

(57) ABSTRACT

A hammer drill/driver with a motor having an output member, a planetary transmission, a clutch assembly and a clutch bypass. The planetary transmission, which includes a ring gear, receives rotary power from the output member and produces a rotary output. The clutch assembly has a clutch profile, which is coupled to the ring gear, and a first pin assembly having a first follower, a first pin member and a first spring that biases the first follower into contact with the clutch profile. The clutch bypass has a bypass profile, which is coupled to the ring gear, and second pin assembly having a second follower, a second pin member, a second spring, which biases the second follower away from the bypass profile, and a third spring, which biases the second follower away from the second pin member. A method for operation of a hammer drill/driver is also provided.

21 Claims, 30 Drawing Sheets

U.S. PATENT DOCUMENTS

| | | | | |
|---|---|---|---|---|
| 3,685,594 | A | 8/1972 | Koehler | |
| 3,736,992 | A | 6/1973 | Zander et al. | |
| 3,783,955 | A | 1/1974 | Gill | |
| 3,808,904 | A | 5/1974 | Gotsch et al. | |
| 3,828,863 | A | 8/1974 | Bleicher et al. | |
| 3,837,409 | A | 9/1974 | Consoli et al. | |
| 3,845,826 | A | 11/1974 | Beisch | |
| 3,847,229 | A | 11/1974 | Wanner et al. | |
| 3,867,988 | A | 2/1975 | Koehler | |
| 3,934,629 | A | 1/1976 | Boman | |
| 4,418,766 | A | 12/1983 | Grossmann | |
| 4,710,071 | A | 12/1987 | Koehler et al. | |
| 4,810,916 | A | 3/1989 | McBride | |
| 4,892,013 | A | 1/1990 | Satoh | |
| 4,986,369 | A | 1/1991 | Fushiya et al. | |
| 5,005,682 | A | 4/1991 | Young et al. | |
| 5,025,903 | A | 6/1991 | Elligson | |
| 5,038,084 | A | 8/1991 | Wing | |
| 5,094,133 | A | 3/1992 | Schreiber | |
| 5,343,961 | A | 9/1994 | Ichikawa | |
| 5,451,127 | A | 9/1995 | Chung | |
| 5,456,324 | A | 10/1995 | Takagi et al. | |
| 5,551,927 | A | 9/1996 | Enzmann et al. | |
| 5,704,433 | A | 1/1998 | Bourner et al. | |
| 5,897,454 | A * | 4/1999 | Cannaliato | 475/265 |
| 6,062,114 | A | 5/2000 | Rahm | |
| 6,076,438 | A | 6/2000 | Rahm | |
| 6,142,242 | A | 11/2000 | Okumura et al. | |
| 6,142,243 | A | 11/2000 | Mayer | |
| 6,173,792 | B1 | 1/2001 | Hald | |
| 6,202,759 | B1 * | 3/2001 | Chen | 173/48 |
| 6,431,289 | B1 | 8/2002 | Potter et al. | |
| 6,523,658 | B2 | 2/2003 | Furuta et al. | |
| 6,533,093 | B2 | 3/2003 | Chen | |
| 6,691,796 | B1 * | 2/2004 | Wu | 173/48 |
| 6,892,827 | B2 * | 5/2005 | Toyama et al. | 173/48 |
| 6,984,188 | B2 * | 1/2006 | Potter et al. | 475/298 |
| 7,101,300 | B2 * | 9/2006 | Milbourne et al. | 475/265 |
| 7,121,361 | B2 * | 10/2006 | Hara et al. | 173/176 |
| 7,168,503 | B1 * | 1/2007 | Teng | 173/48 |

FOREIGN PATENT DOCUMENTS

| | | |
|---|---|---|
| EP | 0 404 035 B1 | 6/1990 |
| EP | 0 411 483 B1 | 7/1990 |
| GB | 2 334 911 | 9/1999 |
| JP | U1-S52-143073 | 10/1977 |
| JP | U1-S59-140179 | 9/1984 |
| JP | U-3004054 | 8/1994 |
| JP | A-H07-40258 | 2/1995 |
| JP | A-H07-148669 | 6/1995 |
| JP | A-H10-58217 | 3/1998 |

* cited by examiner

HAMMER DRILL WITH A MODE CHANGEOVER MECHANISM

CROSS-REFERENCE TO RELATED APPLICATIONS

This application claims the benefit of U.S. Provisional Patent Application Ser. No. 60/655,768 entitled "Hammer Drill With A Mode Changeover Mechanism" and filed Feb. 24, 2005.

INTRODUCTION

The present invention relates generally to hammer drill drivers and more particularly, to systems for changing between a screwdriver mode, which provides a rotary output whose torque is limited by a clutch assembly, a drill mode, which provides a rotary output whose torque is not limited by a clutch assembly, and a hammer drill mode, which provides a rotary and percussive output whose torque is not limited by a clutch assembly.

Manufacturers of power tools are constantly challenged to provide power tools that easily operated yet provide the users with diverse functionality. The challenge becomes more complex where a given power tool is to be marketed globally, as differences in the language and culture of various markets will tend to discourage the marking of the power tool with complex symbols or words.

One arrangement for the adjustment of the operational mode of a hammer drill driver is described in U.S. Pat. No. 5,704,433 entitled "Power Tool and Mechanism" issued Jan. 6, 1998 and RE37,905 entitled "Power Tool and Mechanism" issued Nov. 19, 2002. These patents describe a setting arrangement that combines clutch adjustment and hammer mechanism activation on a single adjustment collar. While this arrangement has been well received by consumers of hammer drill drivers on a global scale, it is our object to provide an easily used mode change-over system for a hammer drill driver with increased functionality.

SUMMARY

In one form, the present teachings provide a hammer drill/driver with a motor having an output member, a planetary transmission, a clutch assembly and a clutch bypass. The planetary transmission, which includes a ring gear, receives rotary power from the output member and produces a rotary output. The clutch assembly has a clutch profile, which is coupled to the ring gear, and a first pin assembly having a first follower, a first pin member and a first spring that biases the first follower into contact with the clutch profile. The clutch bypass has a bypass profile, which is coupled to the ring gear, and second pin assembly having a second follower, a second pin member, a third spring, which biases the second follower away from the bypass profile, and a fourth spring, which biases the second follower away from the second pin member.

In another form, the present teachings provide a method that includes: providing a hand tool with a transmission, an output shaft, a clutch and a clutch bypass, the transmission including a ring gear, the clutch including a clutch profile, which is coupled to the ring gear, and a first follower, the clutch bypass including a bypass profile that is coupled to the ring gear and a second follower, the output shaft being driven by the transmission, the first follower engaging the clutch profile; selecting a drilling mode, in which rotary power is provided to the output shaft, or a hammer drilling mode, in which rotary and percussive power is provided to the output shaft; and moving the second follower into engagement with the bypass profile to inhibit rotation of the ring gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
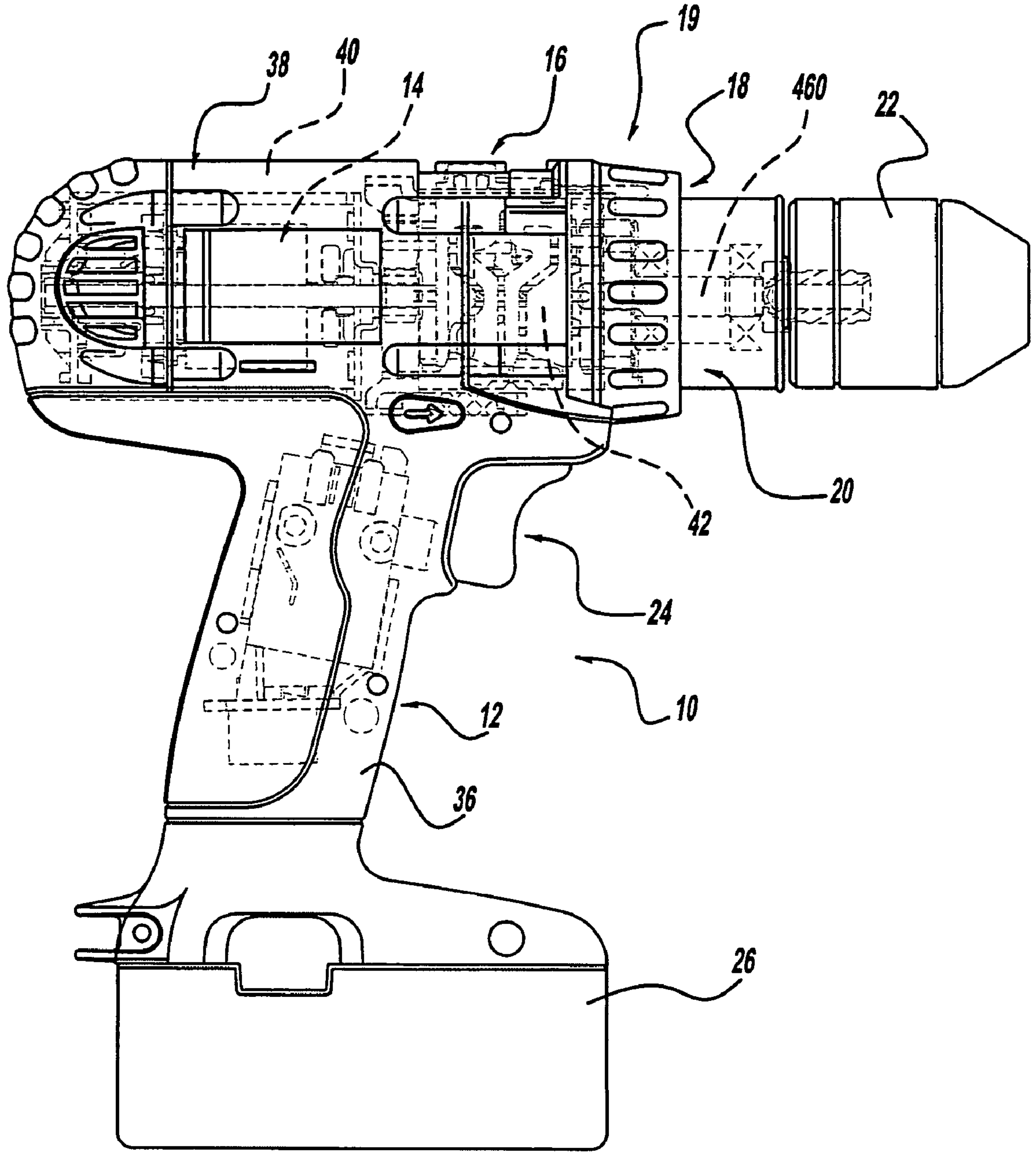
FIG. 1 is a side view of a power tool constructed in accordance with the teachings of the present invention.
Figure 2:
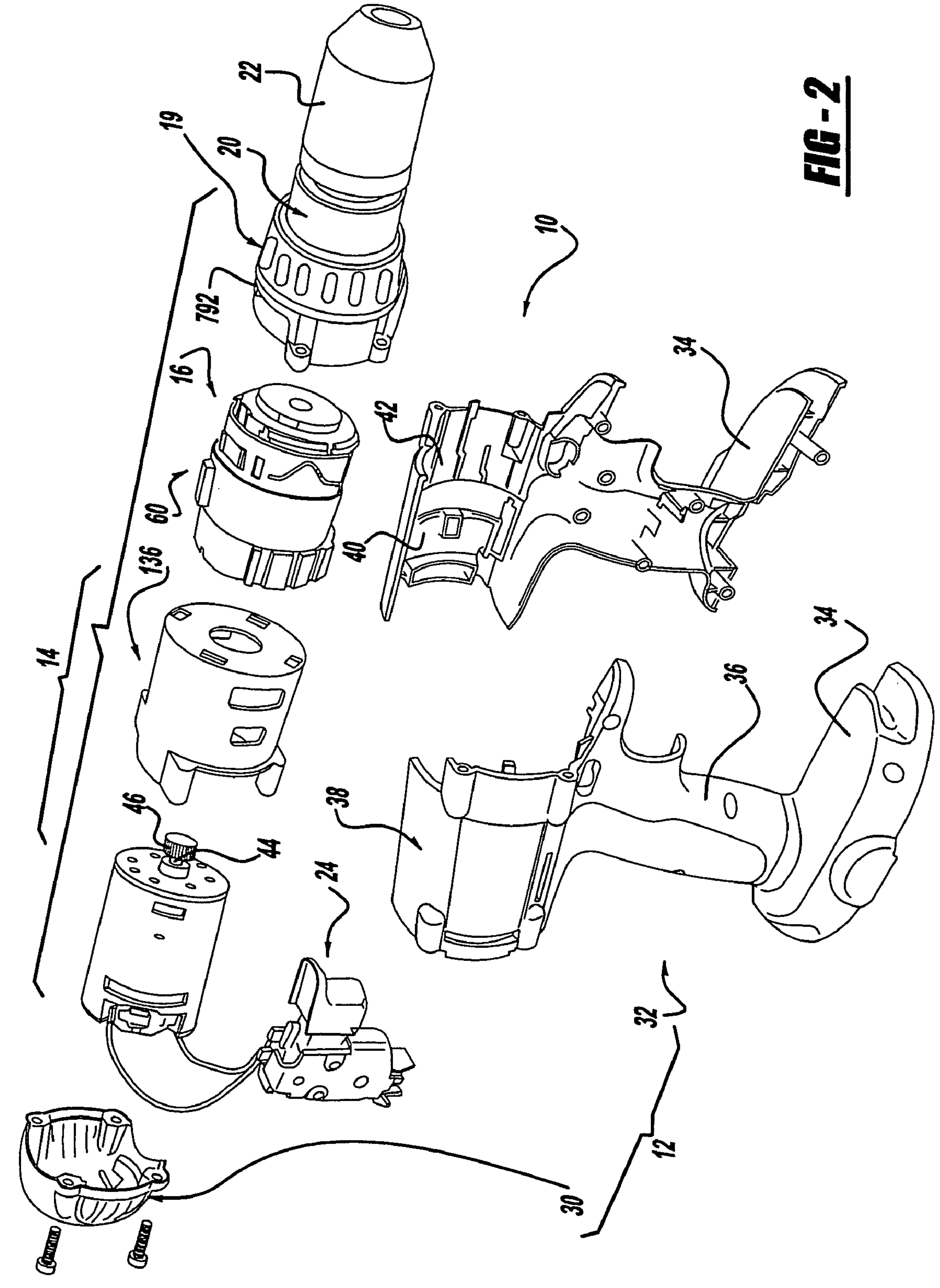
FIG. 2 is an exploded perspective view of a portion of the power tool of FIG. 1.

With reference to FIGS. 1 and 2 of the drawings, a hammer drill/driver constructed in accordance with the teachings of the present invention is generally indicated by reference numeral 10. As those skilled in the art will appreciate, the hammer drill driver 10 may be either a cord or cordless (battery operated) device and can have a housing 12, a motor assembly 14, a multi-speed transmission assembly 16, a clutch mechanism 18, a percussion or hammer mechanism 19, an output spindle assembly 20, a chuck 22, a trigger assembly 24 and a battery pack 26. Those skilled in the art will understand that several of the components of hammer drill/driver 10, such as the chuck 22, the trigger assembly 24 and the battery pack 26, are conventional in nature and need not be described in significant detail in this application.

Reference may be made to a variety of publications for a more complete understanding of the operation of the conventional features of hammer drill/driver 10. One example of such publications is commonly assigned U.S. Pat. No. 5,897,454 issued Apr. 27, 1999, the disclosure of which is hereby incorporated by reference as if fully set forth herein. Except as described herein, the housing 12, the motor assembly 14, the multi-speed transmission assembly 16, the clutch mechanism 18 and portions of the output spindle assembly 20 can be constructed and operated in the manner that is described in detail in U.S. Pat. No. 6,431,289 entitled "Multi-Speed Power Tool Transmission" issued Aug. 13, 2002, which is hereby incorporated by reference as if fully set forth herein in its entirety. Except as described herein, the hammer mechanism 19 and portions of the output spindle assembly 20 can be constructed and operated in a manner that is described in U.S. Pat. No. 5,704,433 entitled "Power Tool and Mechanism" issued Jan. 6, 1998 and RE37,905 entitled "Power Tool and Mechanism" issued Nov. 19, 2002, the disclosures of which are hereby incorporated by reference as if fully set forth herein in their entirety.

The housing 12 can include an end cap assembly 30 and a handle shell assembly 32, which can include a pair of mating handle shells 34. The handle shell assembly 32 can include a handle portion 36 and a drive train or body portion 38. The trigger assembly 24 and the battery pack 26 can be mechanically coupled to the handle portion 36 and can be electrically coupled to the motor assembly 14. The body portion 38 can include a motor cavity 40 and a transmission cavity 42. The motor assembly 14 can be housed in the motor cavity 40 and can include a rotatable output shaft 44, which can extend into the transmission cavity 42. A motor pinion 46, which can have a plurality of gear teeth 46, can be coupled for rotation with output shaft 44. The trigger assembly 24 and the battery pack 26 can cooperate to selectively provide electric power to the motor assembly 14 in a manner that is generally well known in the art so as to control the speed and direction with which the output shaft 44 rotates.

The transmission assembly 16 can be housed in transmission cavity 42 and can include a speed selector mechanism 60. The motor pinion 46 can be coupled through the transmission assembly 16 to the output shaft 44 such that a relatively high speed, low torque drive can be input to transmission assembly 16. The transmission assembly 16 can include a plurality of reduction elements that can be selectively engaged by the speed selector mechanism 60 to provide a plurality of speed ratios. Each of the speed ratios multiplies the speed and torque of the drive input in a predetermined manner, permitting the output speed and torque of the transmission assembly 16 to be varied in a desired manner between a relatively low speed, high torque output and a relatively high speed, low torque output. The transmission output is delivered to the output spindle assembly 20, to which the chuck 22 is coupled for rotation, to permit torque to be transmitted to a tool bit (not shown). The clutch mechanism 18 is coupled to transmission assembly 16 and is operable for controlling the maximum torque that is delivered to the output spindle assembly 20.

Figure 3:
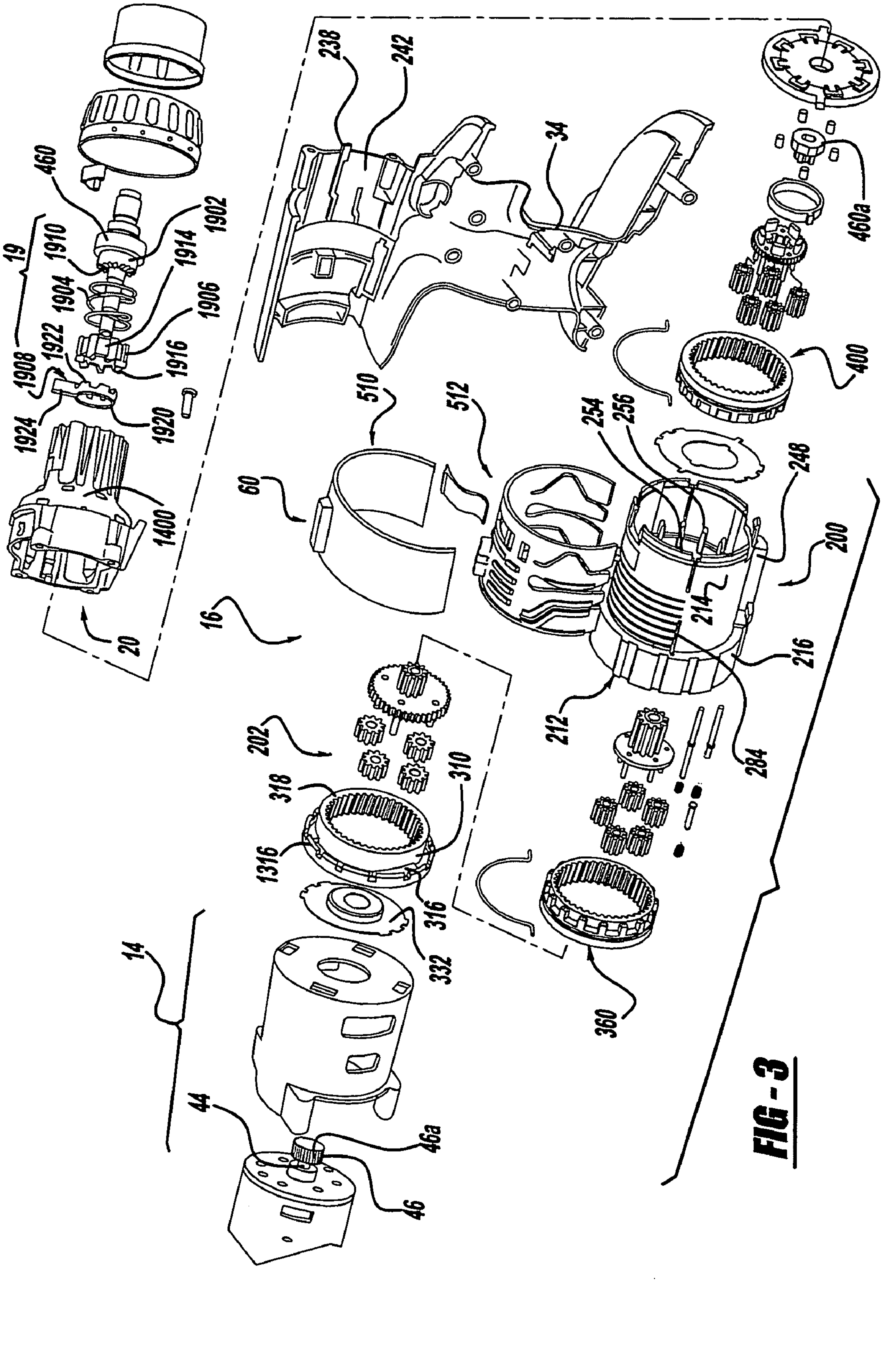
FIG. 3 is an exploded perspective view of a portion of the power tool of FIG. 1, illustrating the transmission assembly in greater detail.

With reference to FIG. 3, the transmission assembly 16 can be a three-stage, three-speed transmission that includes a transmission sleeve 200, a reduction gearset assembly 202 and the speed selector mechanism 60. In the particular example provided, the speed selector mechanism 60 is identical to the speed selector mechanism 60 described in U.S. Pat. No. 6,431,289.

Figure 4:
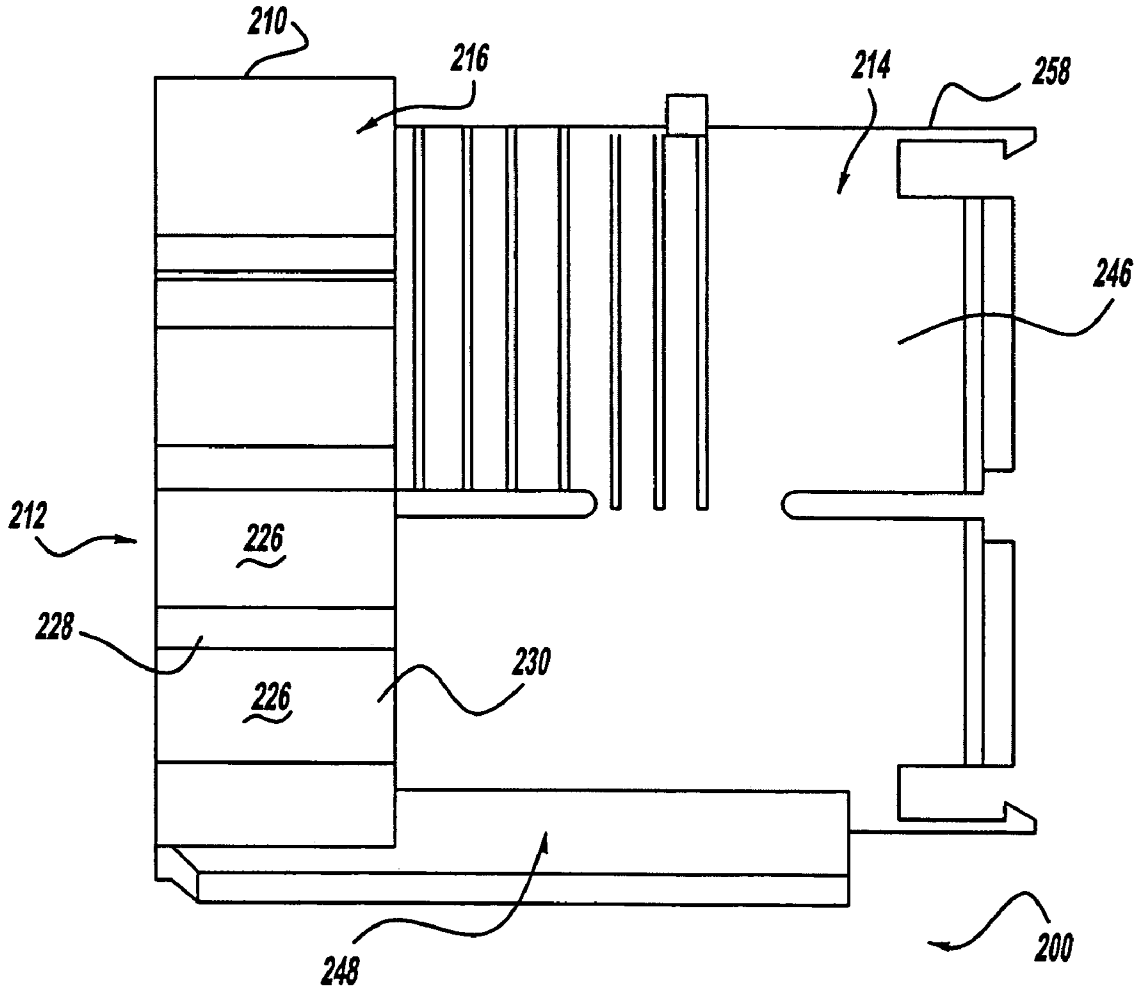
FIG. 4 is a side view of a portion of the transmission assembly illustrating the transmission sleeve.
Figure 5:
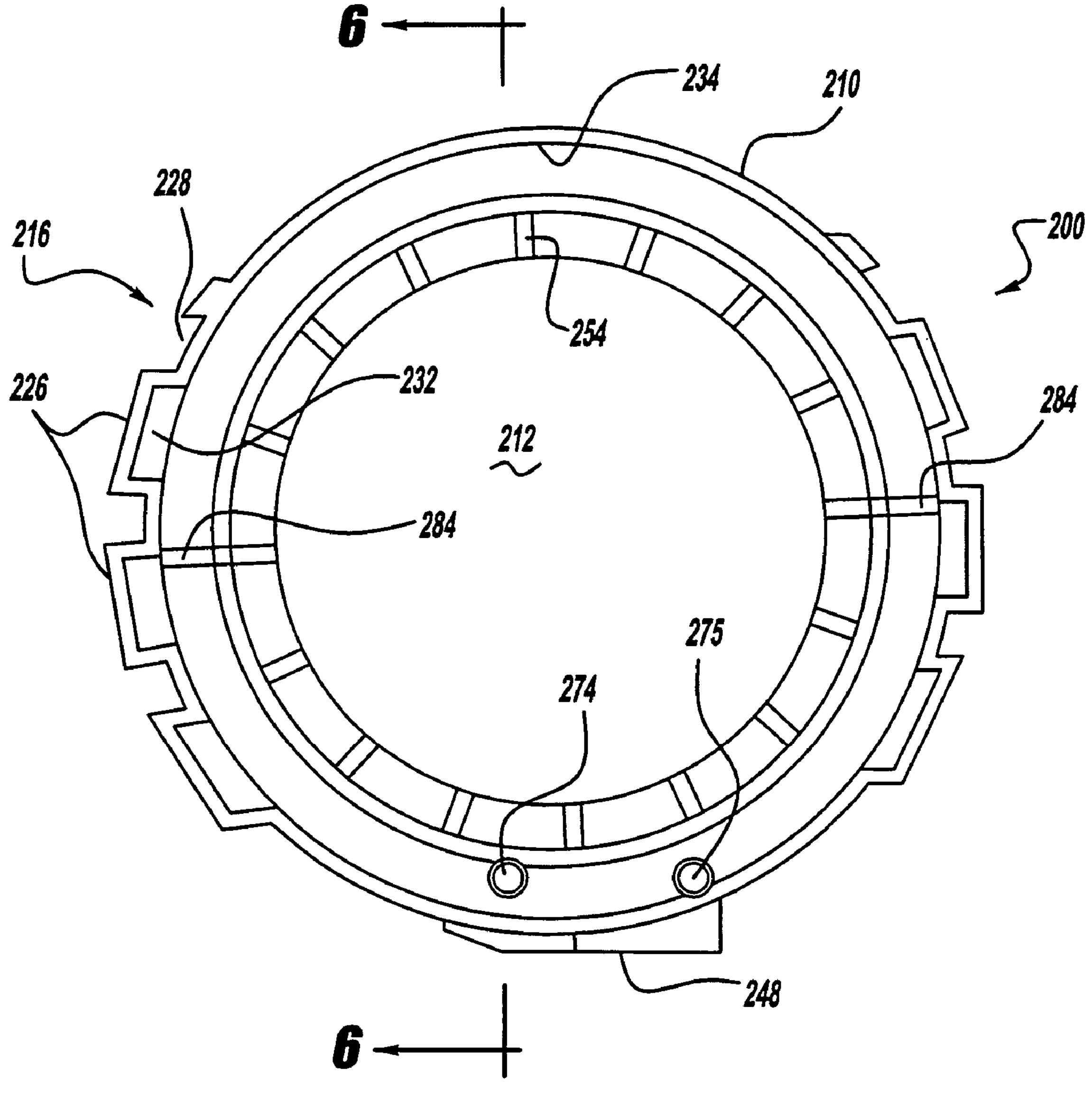
FIG. 5 is a rear view of the transmission sleeve.
Figure 6:
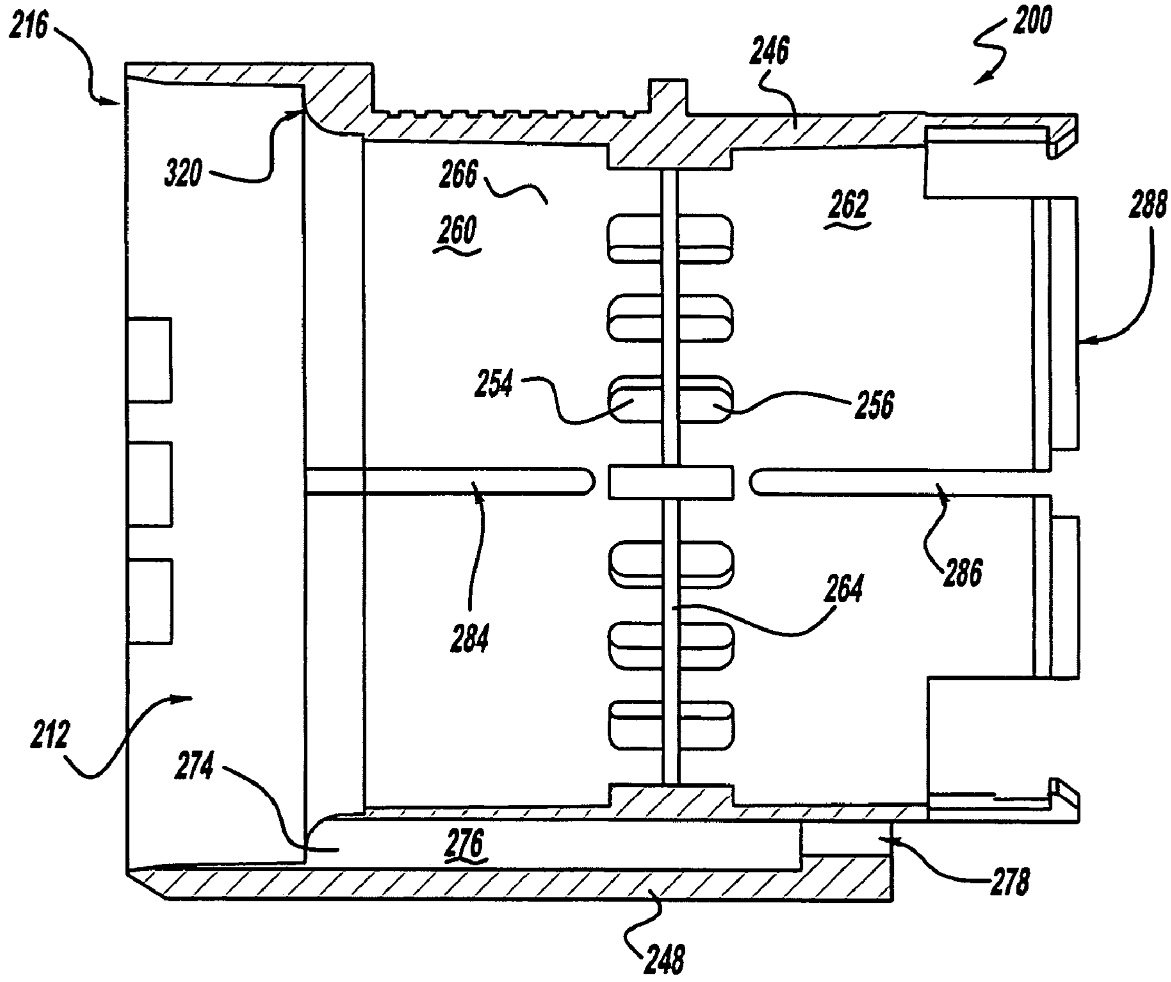
FIG. 6 is a sectional view taken along the line 6-6 of FIG. 5.

With additional reference to FIGS. 4 through 6, the transmission sleeve 200 can include a wall member 210 that can define a generally hollow transmission bore or hollow cavity 212 into which the reduction gearset assembly 202 can be disposed. The transmission sleeve 200 can include a body 214 and a base 216. The body 214 of the transmission sleeve 200 can be fairly uniform in diameter and generally smaller in diameter than the base 216. The inside diameter of the base 216 can be sized to receive a forward end of the motor assembly 14.

A plurality of raised lands 226 can be formed into the base 216. The raised lands 226 can define a plurality of first grooves 228 in the outer surface 230 of the base 216 and a plurality of second grooves 232 in the inner surface 234 of the base 216. The first grooves 228 can be configured to receive alignment ribs 238 that can be formed into the inner surface 242 of the handle shells 34 to align the transmission sleeve 200 to the handle shells 34 and inhibit relative rotation between the transmission sleeve 200 and the handle shells 34. The second grooves 232 will be discussed in greater detail, below.

The body 214 of the transmission sleeve 200 can include a cylindrical body portion 246 and a pin housing portion 248. The cylindrical body portion 246 can include first and second sets of ring engagement teeth 254 and 256, respectively.

A raised bead 264 can segregate the interior of the body portion 246 into first and second housing portions 260 and 262, respectively. The first set of ring engagement teeth 254 can be formed onto the inner surface 266 of the body portion 246 and extend rearwardly from the raised bead 264 toward the base 216. The second set of ring engagement teeth 256 can also be formed into the inner surface of the body portion 246 but can extend forwardly from the raised bead 264. The teeth of the first and second sets of ring engagement teeth 254 and 256 can be uniformly spaced around the inner surface 266 of the body portion 246. The configuration of each tooth in the first and second sets of ring engagement teeth 254 and 256 can be similar.

The pin housing portion 248 can extend radially outwardly from the body portion 246 over a significant portion of the length of the body portion 246. First and second actuator apertures 274 and 275 can be formed into the pin housing portion 248 and can extend rearwardly through the base 216 of the transmission sleeve 200. In the particular embodiment illustrated, the first and/or second actuator apertures 274 and 275 can be stepped, having a first portion 276 with a first diameter at the rear of the transmission sleeve 200 and a second portion 278 with a smaller second diameter at the front of the transmission sleeve 200. In the example shown, the first portion 276 of the first and second actuator apertures 274 and 275 breaks through the wall of the first housing portion 260 and forms a groove 280 into the inner surface 234 of the base 216. The pin housing portion 248 will be discussed in further detail, below.

The remainder of the transmission sleeve 200 can be generally identical to that which is described in U.S. Pat. No. 6,431,289 and as such, further detail on the transmission sleeve 200 need not be provided herein.

Figure 7:
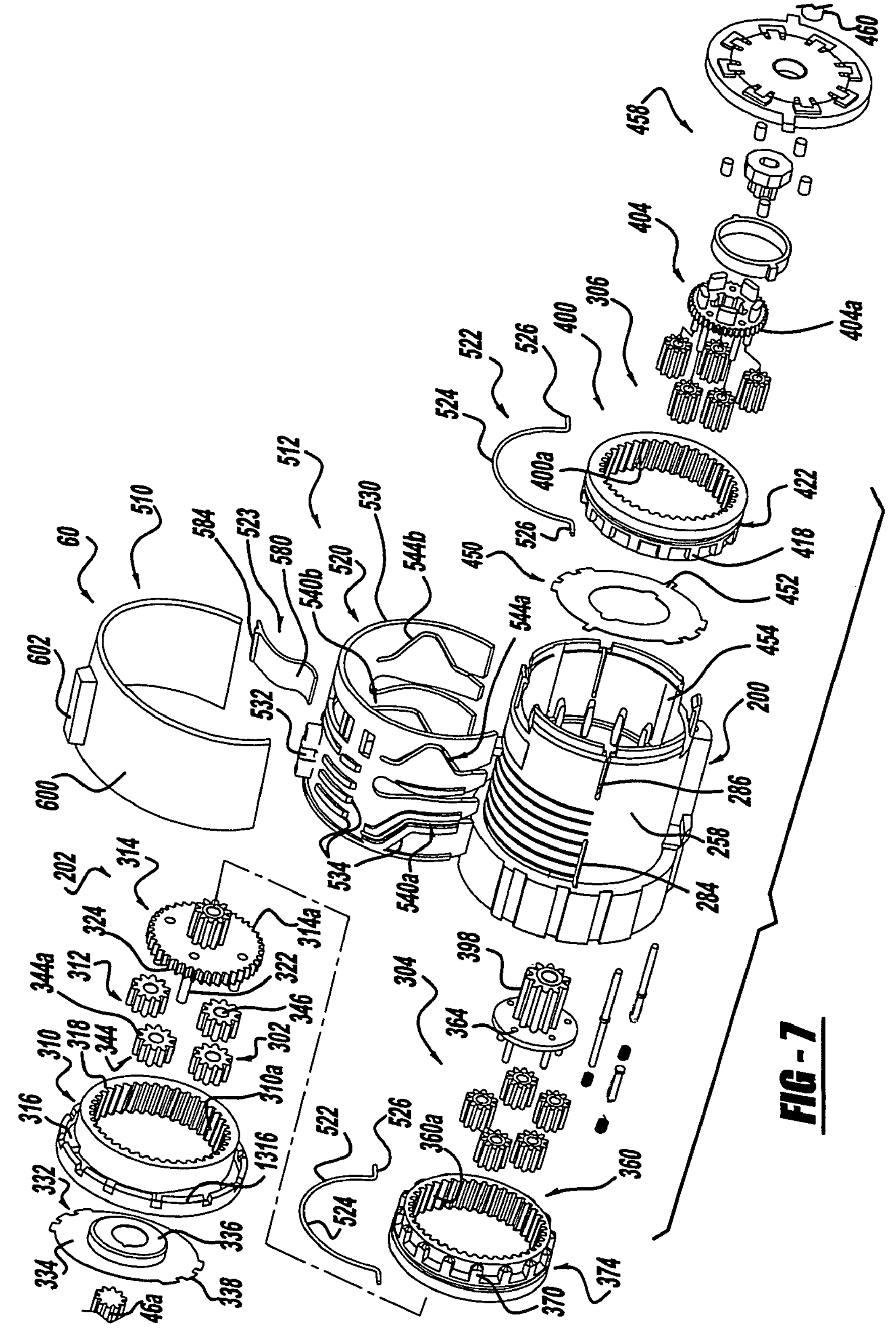
FIG. 7 is an exploded perspective view of a portion of the power tool of FIG. 1, illustrating the reduction gearset assembly, the transmission sleeve, a portion of the housing and a portion of the clutch mechanism in greater detail.

With reference to FIGS. 3 and 7, the reduction gearset assembly 202 can include a first reduction gear set 302, a second reduction gear set 304 and a third reduction gear set 306. The first reduction gear set 302 can be operable in an active mode, while the second and third reduction gear sets 304 and 306 can be are operable in an active mode and an inactive mode. Operation in the active mode causes the reduction gear set to perform a speed reduction and torque multiplication operation, while operation of the reduction gear set in an inactive mode causes the reduction gear set to provide an output having a speed and torque that is about equal to the speed and torque of the rotary input provided to that reduction gear set. In the particular embodiment illustrated, each of the first, second and third reduction gear sets 302, 304 and 306 are planetary gear sets. Those skilled in the art will understand, however, that various other types of reduction gear sets that are well known in the art may be substituted for one or more of the reduction gear sets forming the reduction gearset assembly 202.

The first reduction gear set 302 can include a ring gear 310, a first set of planet gears 312 and a first reduction carrier 314. The first ring gear 310 can be an annular structure, having a plurality of gear teeth 310*a* that can be formed along its interior diameter. A clutch face 316 can be formed into the outer perimeter of the front face 318 of the first ring gear 310 and will be discussed in greater detail, below. The first ring gear 310 can be disposed within the portion of the hollow cavity 212 in the transmission sleeve 200 that is defined by the base 216.

The first reduction carrier 314 can be formed in the shape of a flat cylinder and a plurality of pins 322 can extend from its rearward face 324. A first thrust washer 332 having a first annular portion 334, a second annular portion 336 and a plurality of retaining tabs 338 can be positioned rearwardly of the first reduction gear set 302. The retaining tabs 338 can engage the second grooves 232 (FIG. 5) in the base 216 of the transmission sleeve 200 and as such, relative rotation between the first thrust washer 332 and the transmission sleeve 200 can be inhibited. The motor assembly 14 can be coupled to the transmission sleeve 200 in the manner described in U.S. Pat. No. 6,431,289. In the example provided, the motor assembly 14 cooperates with the transmission sleeve 200 to inhibit axial movement of the first thrust washer 332. The first annular portion 334 contacts the rear face 342 of the first ring gear 310, providing a wear surface and controlling the amount by which the first ring gear 310 is able to move in an axial direction. The second annular portion 336 can be spaced axially apart from the first annular portion 334, extending forwardly of the first annular portion 334 to provide a wear surface for the first set of planet gears 312 that also controls the amount by which they can move in an axial direction.

The first set of planet gears 312 can include a plurality of planet gears 344, each of which being generally cylindrical in shape, having a plurality of gear teeth 344*a* formed into its outer perimeter and a pin aperture 346 formed its their center. Each planet gear 344 can be rotatably supported on an associated one of the pins 322 of the first reduction carrier 314 and can be positioned such that its teeth 344*a* meshingly engage the teeth 314*a* of the first ring gear 310. The teeth 46*a* of the motor pinion 46 on the output shaft 44 are also meshingly engaged with the teeth 344*a* of the planet gears 344, the motor pinion 46 serves as a sun gear for the first reduction gear set 302.

Other aspects of the first reduction gearset 302 as well as details of the second and third reduction gearsets 304 and 306 are disclosed in U.S. Pat. No. 6,431,289 and as such, need not be discussed in detail herein. Briefly, the first reduction gearset 302 can produce a first intermediate torque output that can be input to the second reduction gearset 304. The second reduction gearset 304 is configured to receive torque from the first reduction gearset 302 and produce a second intermediate torque that is output to the third reduction gearset 306. The third reduction gearset 306 is configured to receive torque from the second reduction gearset 304 and to produce an output torque that can be transmitted to an output spindle 460 (FIG. 1). In the particular example provided, the overall gear or speed reduction of the reduction gearset assembly 202 is dictated by the axial positions of the second and third ring gears 360 and 400, respectively, which are associated with the second and third reduction gearsets 304 and 306, respectively. More specifically, the second and third ring gears 360 and 400 can each be translated via the speed selector mechanism 60 between a first position, in which their respective reduction gearset (304 or 306) is operated in the active condition, and a second position, in which their respective reduction gearset (304 or 306) is operated in the inactive condition.

When the second ring gear 360 is placed in the first position, a plurality of teeth 370 formed about the circumference of the second ring gear 360 engage the first set of ring engagement teeth 254 formed on the interior of the transmission sleeve 200 to thereby non-rotatably couple the second ring gear 360 and the transmission sleeve 200. When the second ring gear 360 is placed in the second position, the teeth 370 are disengaged from the first set of ring engagement teeth 254 and the internal teeth 360*a* of the ring gear 360 are engaged to teeth 314*a* formed on the first reduction carrier 314 to thereby cause the second ring gear 360 to co-rotate with a second sun gear 358 and a second reduction carrier 364. Similarly, when the third ring gear 400 is placed in the first position, a plurality of teeth 418 formed about the circumference of the third ring gear 400 engage the second set of ring engagement teeth 256 formed on the interior of the transmission sleeve 200 to thereby non-rotatably couple the third ring gear 400 and the transmission sleeve 200. When the third ring gear 400 is placed in the second position, the teeth 418 are disengaged from the second set of ring engagement teeth 256 and the internal teeth 400*a* of the ring gear 400 are engaged to teeth 404*a* formed on a third reduction carrier 404 to thereby cause the third ring gear 400 to co-rotate with a third sun gear 398 and the third planet carrier 404.

As noted above, the axial position of the second and third ring gears 360 and 400 can be changed via the speed selector mechanism 60. Briefly, the speed selector mechanism 60 can include a switch portion 510, which can be configured to receive a speed change input, and an actuator portion 512, which can be configured to manipulate the reduction gearset assembly 202 in accordance with the speed change input.

In the particular embodiment illustrated, the actuator portion 512 includes a rotary selector cam 520, a plurality of wire clips 522 and a spring member 523. Each of the wire clips 522 can be formed from a round wire which can be bent in the shape of a semi-circle 524 with a pair of tabs 526 that can extend outwardly from the semi-circle 524. The semi-circle 524 can be sized to fit within clip grooves 374 and 422 that can be formed circumferentially about the second and third ring gears 360 and 400, respectively. The tabs 526 of the wire clips 522 can extend outwardly of the hollow cavity 212 into an associated clip slot 284, 286 that is formed into the transmission sleeve 200. The tabs 526 are long enough so that they extend outwardly of the outer surface 258 of the body 214 of the transmission sleeve 200.

The rotary selector cam 520 can include an arcuate selector body 530 and a switch tab 532. A pair of first cam slots 540*a* and 540*b* and a pair of second cam slots 544*a* and 544*b*, can be formed through the selector body 530. The selector body 530 is sized to engage the outside diameter of the body portion 246 of the transmission sleeve 200 in a slip-fit manner. Each of the first cam slots 540*a* and 540*b* is sized to receive one of the tabs 526 of the wire clip 522 that is engaged to the second ring gear 360, while each of the second cam slots 544*a* and 544*b* is sized to receive one of the tabs 526 of the wire clip 522 that is engaged to the third ring gear 400. Each pair of the cam slots is configured to cooperate with an associated one of the wire clips 522 to axially position a respective one of the second and third ring gears 360 and 400 in response to rotation of the rotary selector cam 520, which can be effected through an arcuate band 600 associated with the switch portion 510. In the particular example provided, a selector button 602, which is coupled to the rotary selector cam 520 via the switch tab 532, is configured to transmit a manual input received from an operator or user to the rotary selector cam 520.

Figure 8:
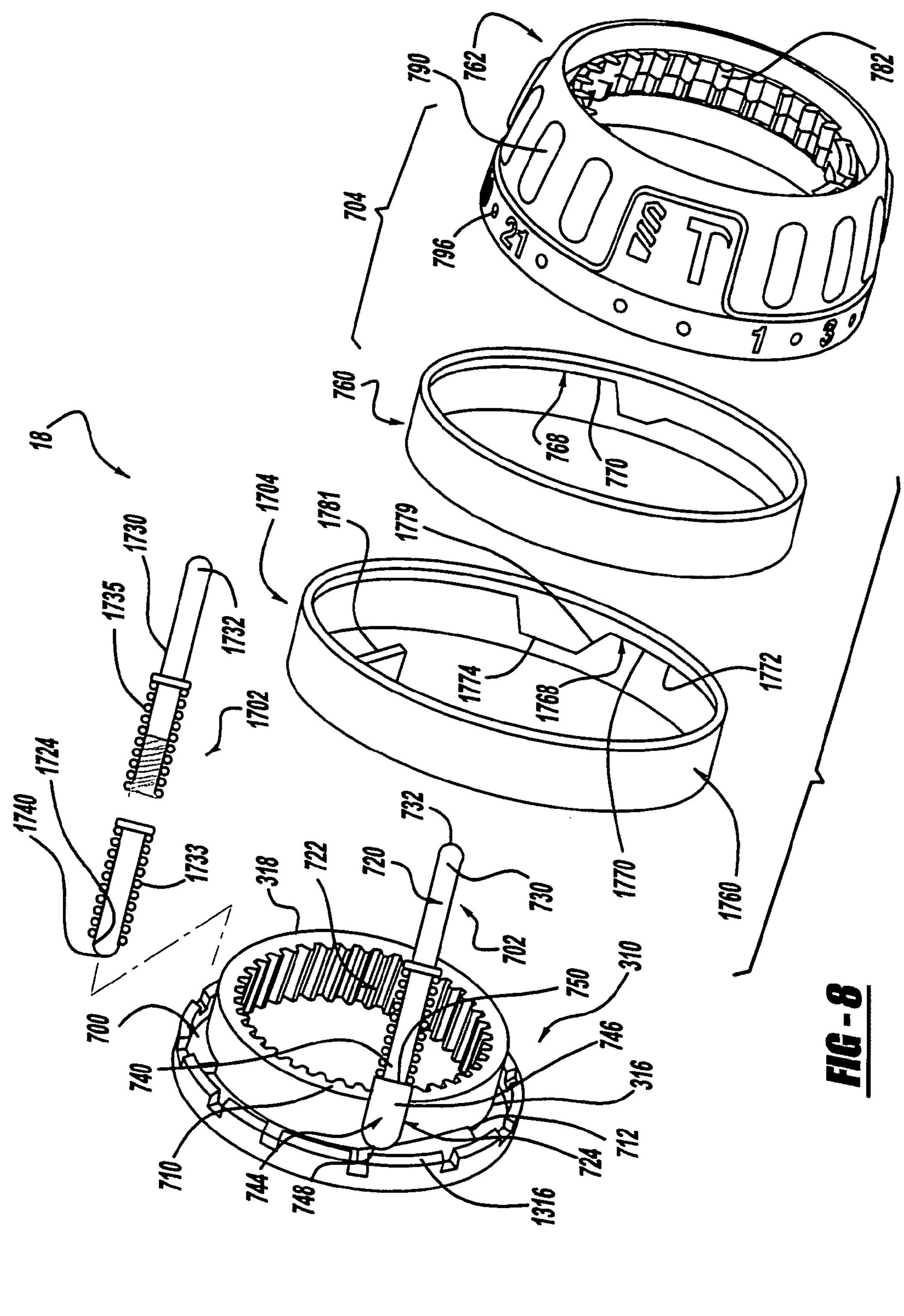
FIG. 8 is an exploded perspective view of a portion of the power tool of FIG. 1 illustrating the clutch mechanism and the hammer mechanism in greater detail.

With reference to FIGS. 3 and 8, the clutch mechanism 18 can include a clutch member 700, a first engagement assembly 702, a first adjustment mechanism 704, a second engagement assembly 1702 and a second adjustment mechanism 1704, the output spindle 20 can include a housing or gear case 1400, the output spindle 460 and a mounting collar 1404, while the hammer mechanism 19 includes a first cam 1902, a spring 1904, a second cam 1906 and an actuator 1908.

The clutch member 700 can be an annular structure that is fixed to the outer diameter of the first ring gear 310 and extend radially outwardly therefrom. The clutch member 700 can include the annular clutch face 316 that is formed into the front face 318 of the first ring gear 310 and optionally locking features 1316, such as teeth, lugs or castellations that can be radially spaced (e.g., radially outwardly) from the annular clutch face 316.

The outer diameter of the clutch member 700 can be sized to rotate within the portion of the hollow cavity 212 that is defined by the base 216 of the transmission sleeve 200. The clutch face 316 of the example illustrated is shown to be defined by a plurality of peaks 710 and valleys 712 that are arranged relative to one another to form a series of ramps that are defined by an angle of about 18°. Those skilled in the art will understand, however, that other clutch face configurations may also be employed.

The first engagement assembly 702 can include a pin member 720, a follower spring 722 and a follower 724. The pin member 720 can include a cylindrical body portion 730 having an outer diameter that is sized to slip-fit within the second portion 278 (FIG. 6) of the first actuator aperture 274 (FIG. 6) that is formed into the pin housing portion 248 of the transmission sleeve 200. The pin member 720 also includes a tip portion 732 and a head portion 734. The tip portion 732 is configured to engage the adjustment mechanism 704 and in the example shown, is formed into the end of the body portion 730 of the pin member 720 and defined by a spherical radius. The head portion 734 is coupled to the end of the body portion 730 opposite the tip portion 732 and is shaped in the form of a flat cylinder or barrel that is sized to slip fit within the first portion 276 (FIG. 6) of the actuator aperture 274 (FIG. 6). Accordingly, the head portion 734 prevents the pin member 720 from being urged forwardly out of the actuator aperture 274 (FIG. 6).

The follower spring 722 is a compression spring whose outside diameter is sized to slip fit within the first portion 276 (FIG. 6) of the actuator aperture 274 (FIG. 6). The forward end of the follower spring 722 contacts the head portion 734 of the pin member 720, while the opposite end of the follower spring 722 contacts the follower 724. The end portion 740 of the follower 724 is cylindrical in shape and sized to slip fit within the inside diameter of the follower spring 722. In this regard, the end portion 740 of the follower acts as a spring follower to prevent the follower spring 722 from bending over when it is compressed. The follower 724 also includes a follower portion 744 having a cylindrically shaped body portion 746, a tip portion 748 and a flange portion 750. The body portion 746 is sized to slip fit within the first portion 276 of the actuator aperture 274. The tip portion 748 is configured to engage the clutch face 316 and in the example shown, is formed into the end of the body portion 746 of the follower 724 and defined by a spherical radius. The flange portion 750 is formed at the intersection between the body portion 746 and the end portion 740. The flange portion 750 is generally flat and configured to receive a biasing force that is exerted by the follower spring 722.

Figure 9:
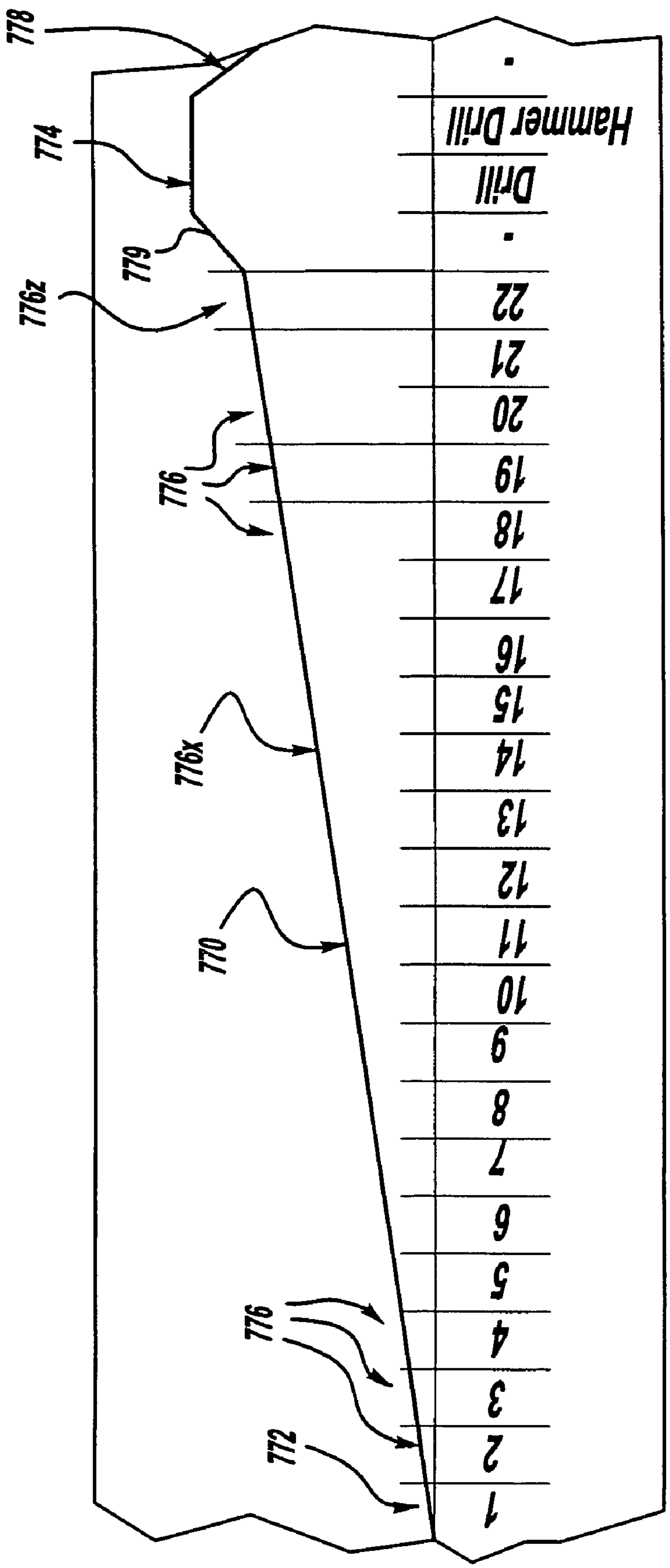
FIG. 9 is a schematic illustration of the adjustment structure in an "unwrapped" state.
Figure 10:
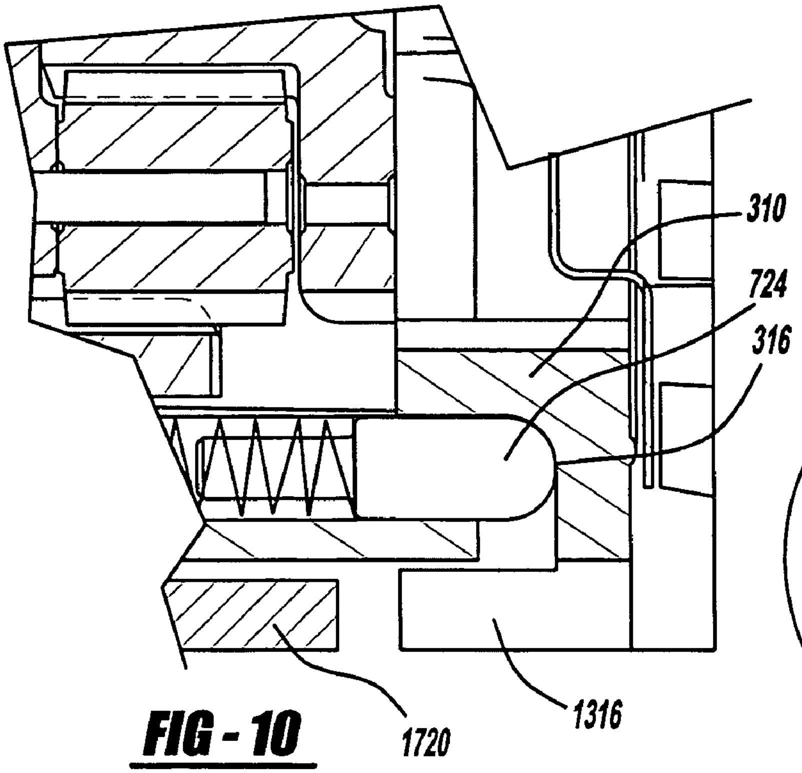
FIG. 10 is a partial sectional view taken along the longitudinal axis of the power tool of FIG. 1 and illustrating the clutch assembly in a screwdriver mode.
Figure 11:
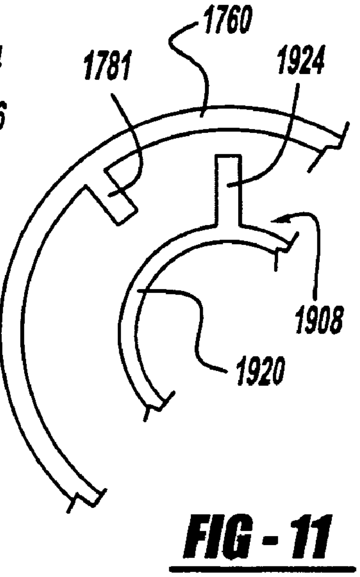
FIG. 11 is a partial sectional view taken generally transverse to the longitudinal axis of the power tool of FIG. 1 and illustrating the relationship between the hammer activation tab and the actuator tab when the power tool is operated in the screwdriver mode.
Figure 12:
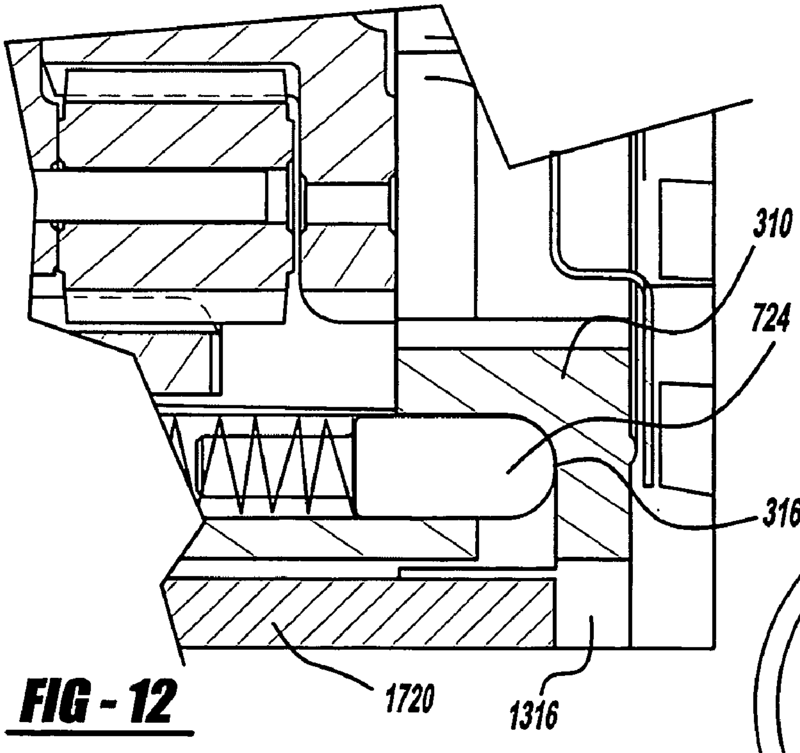
FIG. 12 is a partial sectional view similar to that of FIG. 10 but illustrating the power tool as operated in a drill mode.
Figure 13:
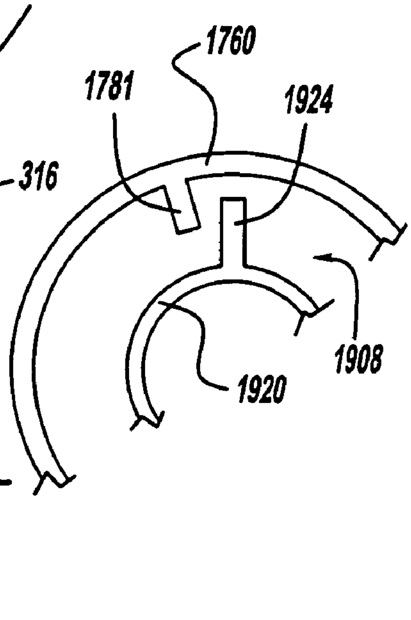
FIG. 13 is a partial sectional view similar to that of FIG. 11 but illustrating the power tool as operated in the drill mode.
Figure 14:
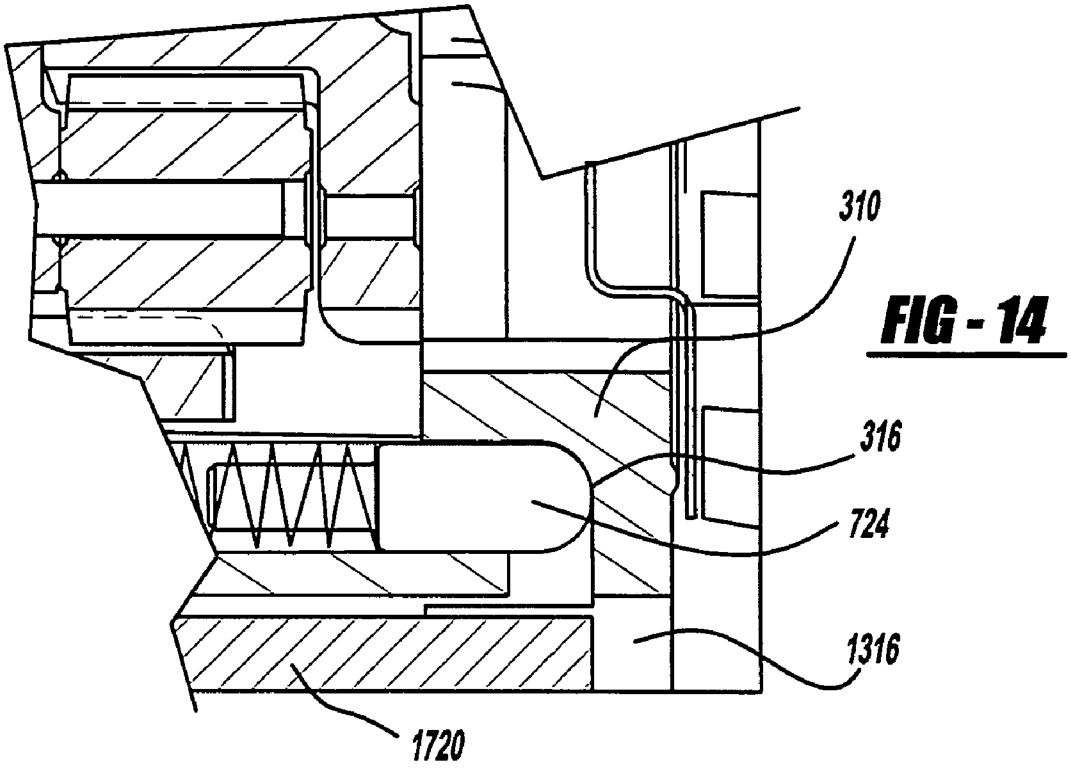
FIG. 14 is a partial sectional view similar to that of FIG. 10 but illustrating the power tool as operated in a hammer drill mode.
Figure 15:
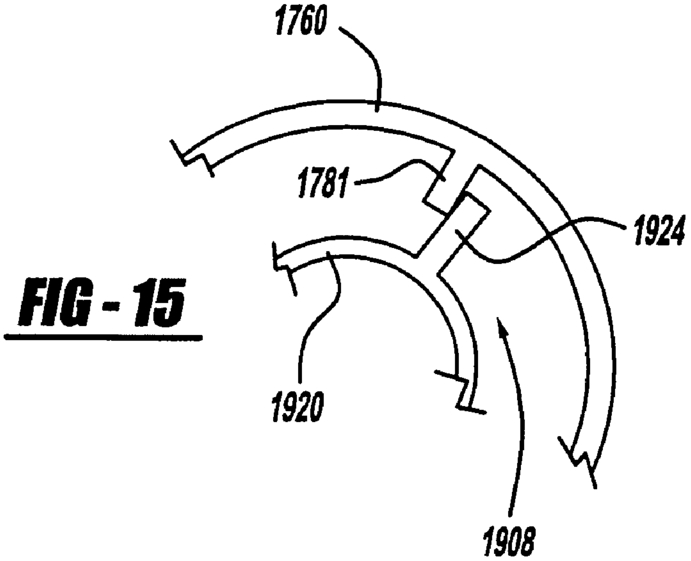
FIG. 15 is a partial sectional view similar to that of FIG. 11 but illustrating the power tool as operated in the hammer drill mode.

The first adjustment mechanism 704 can include a first adjustment structure 760 and a setting collar 762. The first adjustment structure 760 can be shaped in the form of a generally hollow cylinder that is sized to fit about the gear case 1400 of the output spindle assembly 20. The first adjustment structure 760 can include an annular face 768 into which an adjustment profile 770 is formed. With additional reference to FIG. 9, the adjustment profile 770 can include a first adjustment segment 772, a last adjustment segment 774, a plurality of intermediate adjustment segments 776 and an optional ramp section 778 between the first and last adjustment segments 772 and 774. In the embodiment illustrated, a second ramp section 779 is included between the last intermediate adjustment segment 776*z* and the last adjustment segment 774. Also in the particular embodiment illustrated, the portion of the adjustment profile 770 from the first adjustment segment 772 through the last one of the intermediate adjustment segments 776*z* is formed as a ramp having a constant slope.

The setting collar 762 can be coupled to the first adjustment structure 760 and can include a plurality of raised gripping surfaces 790 that permit the user of the hammer drill driver 10 to comfortably rotate both the setting collar 762 and the adjustment structure 760 to set the adjustment profile 770 at a desired one of the adjustment segments 772, 774 and 776. A setting indicator can be employed to indicate the position of the adjustment profile 770 relative to the housing portion 766 of the output spindle assembly 20. The setting indicator can includes an arrow 792 (FIG. 2) formed onto the output spindle assembly 20 and a scale 796 that is marked into the circumference of the setting collar 762.

The second engagement assembly 1702 can include a first pin 1730, a second pin 1720, a first spring 1733 and a second spring 1735. The first pin 1730 can include a cylindrical body portion having an outer diameter that is sized to slip-fit within the second portion 278 (FIG. 6) of the second actuator aperture 275 (FIG. 5) that is formed into the pin housing portion 248 of the transmission sleeve 200. The second pin 1720 can also include a tip portion 1732 and a follower 1724. The tip portion 1732 can be configured to engage the second adjustment mechanism 1704. In the example provided, the first spring 1733, which can be a compression spring, is disposed between the transmission sleeve 200 and an annular flange formed about the cylindrical body portion of the second pin 1720 and urges the second pin 1720 forwardly into contact with the first pin 1730 such that the tip portion 1732 engages the second adjustment mechanism 1704. The end portion 1740 of the follower 1724 can be formed to engage the locking features 1316 that are formed on the clutch member 700 or in the alternative, the annular clutch face 316. The second spring 1735, which can be a compression spring, can be disposed between the first pin 1730 and the second pin 1720 and can permit the first pin 1730 to move axially in situations where the second pin 1720 is restrained from moving axially rearward (e.g., when the second pin 1720 is axially in-line with the structure on which the locking features 1316 is formed).

The second adjustment mechanism 1704 can include a second adjustment structure 1760, and can employ the setting collar 762, as in the present example, or a separate setting collar (not shown). The second adjustment structure 1760 can be shaped in the form of a generally hollow cylinder that is sized to fit about the gear case 1400 of the output spindle assembly 20 radially separated (e.g., radially outwardly) of the first adjustment structure 760. Optionally, the second adjustment structure 1760 may be offset from (e.g., located rearwardly of) the first adjustment structure 760. The second adjustment structure 1760 can include an annular face 1768 into which an adjustment profile 1770 is formed. The adjustment profile 1770 can includes a first adjustment segment 1772, a last adjustment segment 1774, a ramp section 1779 that is disposed between the first adjustment segment 1772 and the last adjustment segment 1774, and a hammer activation tab 1781.

The first cam 1902 of the hammer mechanism 19 can be unitarily formed with the output spindle 460 and include a plurality of ratchet teeth 1910. The second cam 1906 can include a plurality of mating ratchet teeth (not specifically shown), a plurality of engagement tabs 1914 and a plurality of engagement castellations 1916. The second cam 1906 can be received into the gearcase 1400 such that the engagement tabs 1914 are slidingly engaged into corresponding recesses that are formed on the interior of the gearcase 1400. The actuator 1908 can include a body portion 1920 with a plurality of mating castellations 1922 and an actuator tab 1924. The actuator 1908 is received into the gearcase 1400 rearwardly of the second cam 1906 such that the actuator tab 1924 extends outwardly of the gearcase 1400 and is positioned in the rotational path of the hammer activation tab 1781 on the second adjustment structure 1760. The spring 1904 can be a compression spring and can bias the first and second cams 1902 and 1906 apart from one another. It will be appreciated that the actuator 1908 is biased by a torsion spring (not shown) toward a position where the hammer mechanism is de-activated.

With reference to FIGS. 1 through 3 and 8 through 11, during the operation of the tool 10, an initial drive torque is transmitted by the motor pinion 46 from the motor assembly 14 to the first set of planet gears 312 causing the first set of planet gears 312 to rotate. In response to the rotation of the first set of planet gears 312, a first intermediate torque is applied against the first ring gear 310. A clutch torque, the magnitude of which is dictated by the adjustment mechanism 704, can be employed to resist rotation of the first ring gear 300. In this regard, positioning of the adjustment mechanism 704 at a predetermined one of the adjustment segments 772, 774 or 776 pushes the pin member 720 rearwardly in the actuator aperture 274 (FIG. 6), thereby compressing the follower spring 722 and producing the a clutch force. The clutch force is transmitted to the flange portion 750 of the follower 724, causing the tip portion 748 of the follower 724 to engage the clutch face 316 and generating the clutch torque. Positioning of the tip portion 748 of the follower 724 in one of the valleys 712 in the clutch face 316 operates to inhibit rotation of the first ring gear 310 relative to the transmission sleeve 200 when the magnitude of the clutch torque exceeds the first intermediate torque. When the first intermediate torque exceeds the clutch torque, however, the first ring gear 310 is permitted to rotate relative to the transmission sleeve 200. Depending upon the configuration of the clutch face 316, rotation of the first ring gear 310 may cause the clutch force to increase a sufficient amount to resist further rotation. In such situations, the first ring gear 310 will rotate in an opposite direction when the magnitude of the first intermediate torque diminishes, permitting the tip portion 748 of the follower 724 to align in one of the valleys 712 in the clutch face 316. If rotation of the first ring gear 310 does not cause the clutch force to increase sufficiently so as to fully resist rotation of the first ring gear 310, the rotation of the first ring gear 310 will effectively limit the amount of torque that is transmitted through the transmission assembly 16 to the output spindle 460.

With reference to FIGS. 1 through 3, 8, 12 and 13, in situations where it is desired to provide a relatively high toque output from the hammer drill driver 10, such as when drilling, the setting collar 762 may be rotated into a "drill position" to cause the second adjustment structure 1760 to index the pin member 1720 rearwardly so that it will engage the locking features 1316. In this condition, the pin member 1720 cooperates with the locking features 1316 to inhibit rotation of the first ring gear 310 regardless of the force that is exerted by the follower 724 on the clutch face 316 and regardless of the torque that is exerted onto the first ring gear 310 by the first planet gears 344.

As rotation of the first ring gear 310 is inhibited via engagement of the pin member 1720 to the locking features 1316, those of ordinary skill in the art will appreciate that the first adjustment structure 760 may be configured so as to set the amount of force that is exerted by the follower spring 722 at a desired level, which can be a level that is below a maximum torque setting that is dictated by the last adjustment segment 774.

With reference to FIGS. 1 through 3, 8, 14 and 15, in situations where it is desired to provide axial percussion with a relatively high toque output from the hammer drill driver 10, the setting collar 762 may be rotated past the "drill position" into a "hammer drill position" to cause the hammer activation tab 1781 on the second adjustment structure 1760 to index the second cam 1906 rearwardly in the gearcase 1400 against the bias of the spring 1904 such that the ratchet teeth 1910 of the first cam 1902 engage the ratchet teeth of the second cam 1906. As the output spindle 460 is axially displaceable but rotationally coupled with the output member 460*a* of the transmission assembly 16, the output spindle 460 will reciprocate as it rotates due to the engagement of the ratchet teeth 1910 with the ratchet teeth of the second cam 1906 in a manner that is well known in the art. In the particular example provided, the second adjustment structure 1760 can be configured to maintain (relative to the drill position) the pin member 1720 in a rearward position so that it will remain engaged the locking features 1316.

Figure 16:
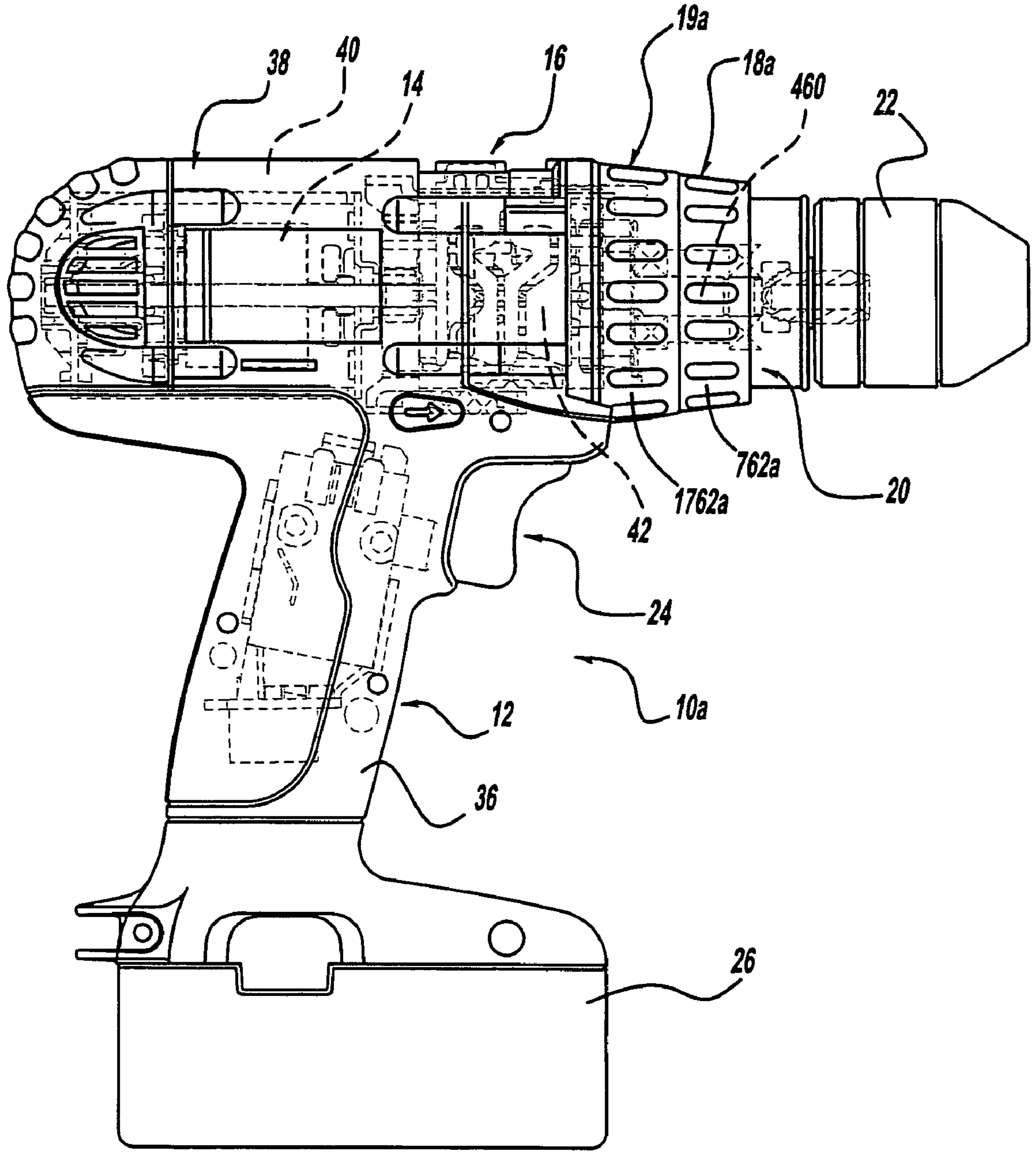
FIG. 16 is a side view of a second power tool constructed in accordance with the teachings of the present invention.
Figure 17:
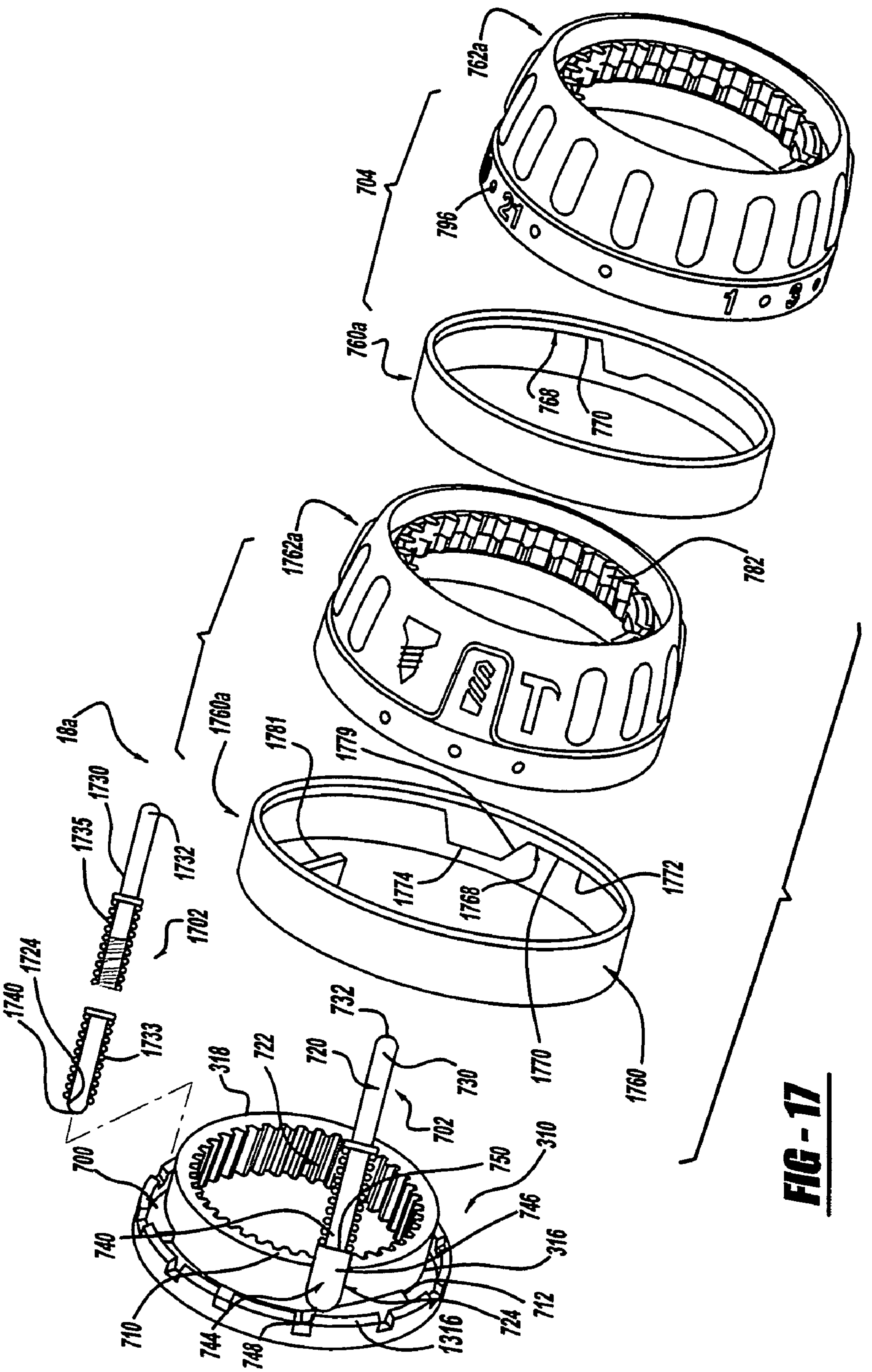
FIG. 17 is an exploded perspective view of a portion of the power tool of FIG. 16 illustrating the clutch mechanism and the hammer mechanism in greater detail.

While the hammer drill driver has been described thus far as utilizing a pair of adjustment mechanisms that share a common setting collar, those skilled in the art will appreciate that the invention, in its broader aspects, may be constructed somewhat differently. For example, the first and second adjustment mechanisms 704*a* and 1704*a* may be constructed as shown in FIGS. 16 and 17. In this arrangement, the hammer drill driver 10*a* is generally identical to the hammer drill driver 10 discussed about but rather than utilizing a single adjustment collar 762 to control the torque setting of the clutch assembly 18*a*, locking of the first ring gear 310 (FIG. 3) to bypass the clutch assembly 18*a* and operational state of the hammer mechanism 19*a*, the hammer drill driver 10*a* can include a setting collar 762*a* that can be employed to selectively position the first adjustment structure 760 and a second setting collar 1762*a*, which is axially offset from the setting collar 762*a*, and can be employed to selectively position the second adjustment structure 1760*a*. In this example, the setting collar 762*a* and the second setting collar 1762*a* may be adjusted independently of the other.

Figure 18:
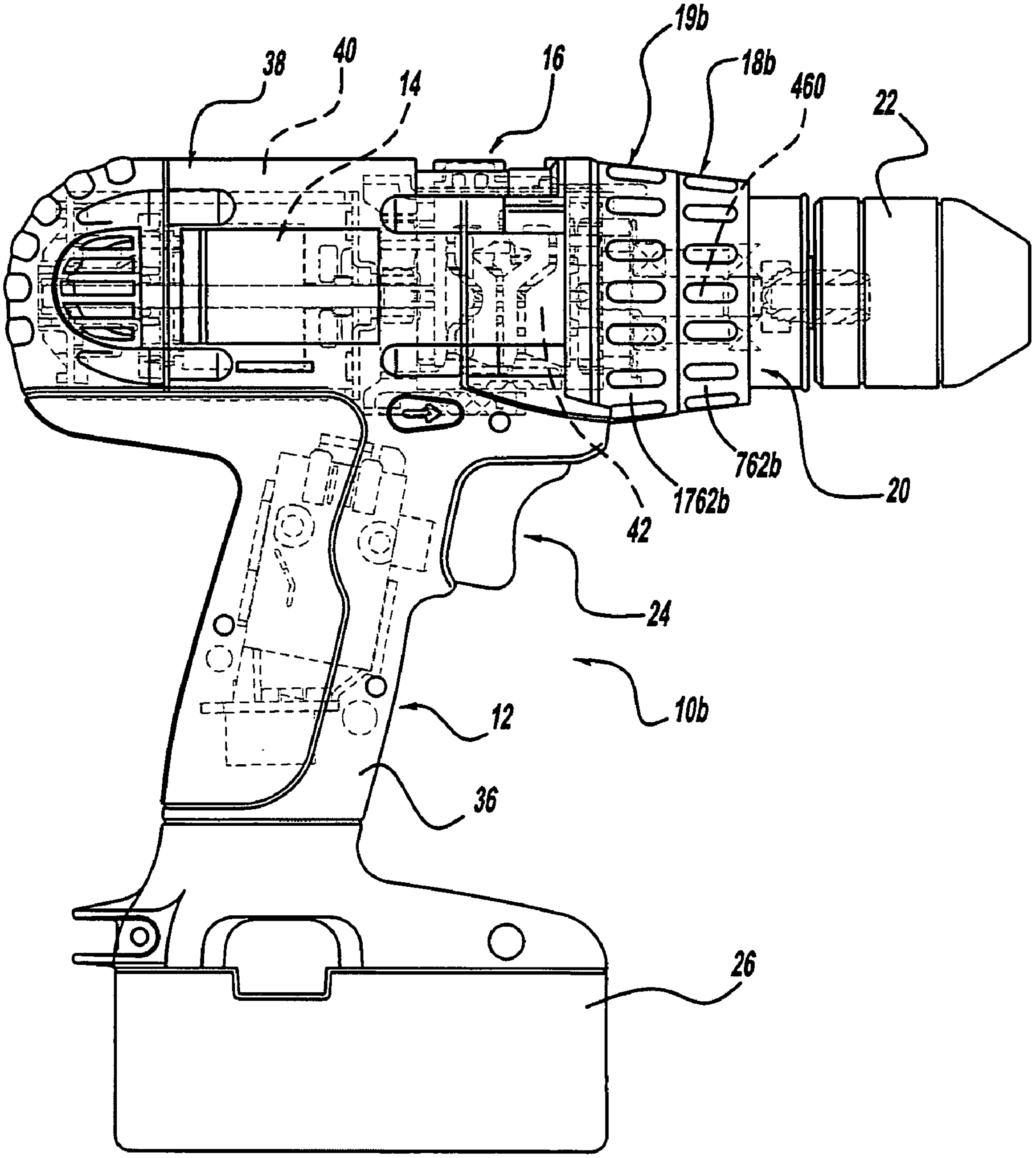
FIG. 18 is a side view of a third power tool constructed in accordance with the teachings of the present invention.
Figure 19:
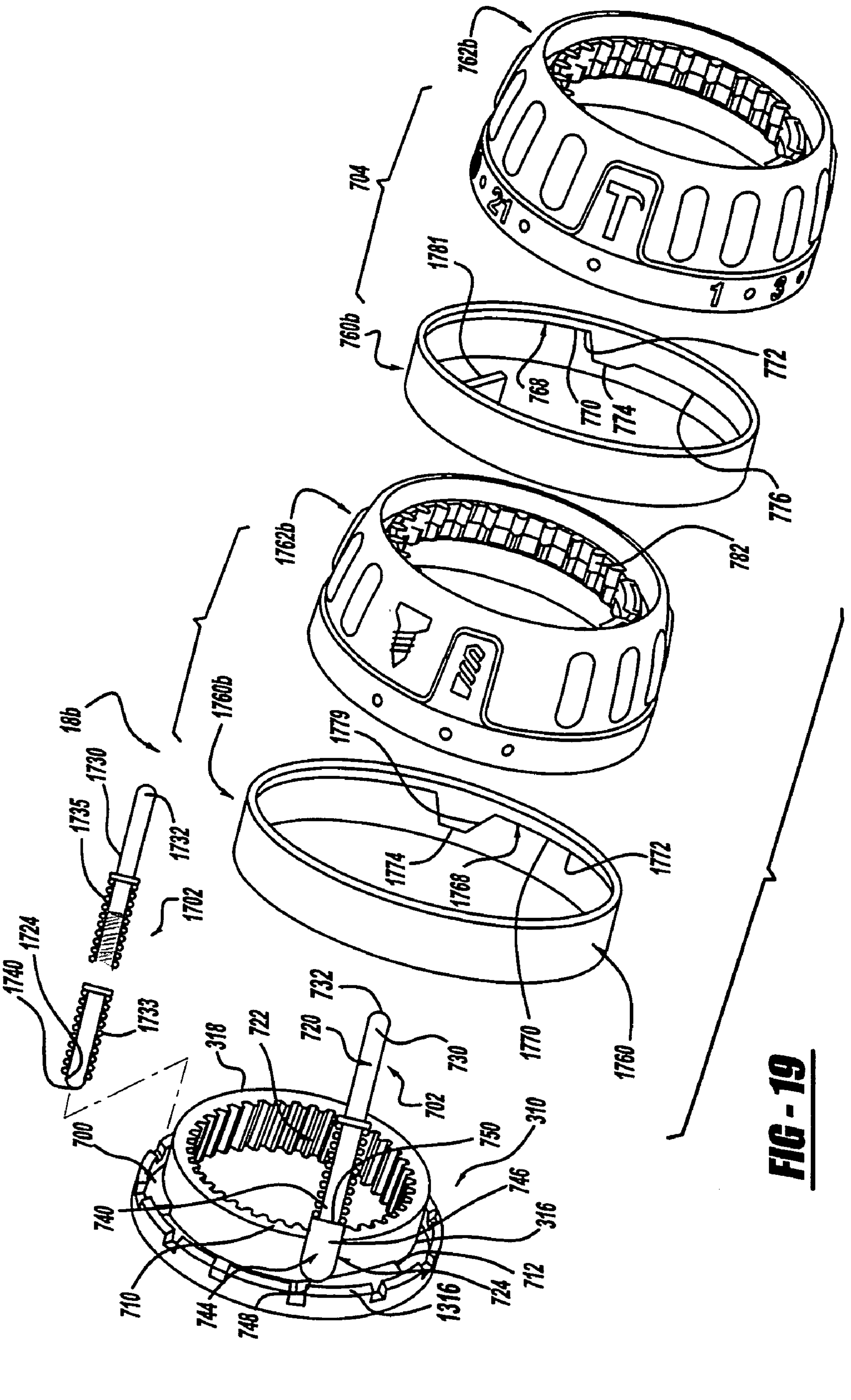
FIG. 19 is an exploded perspective view of a portion of the power tool of FIG. 16 illustrating the clutch mechanism and the hammer mechanism in greater detail.
Figure 20:
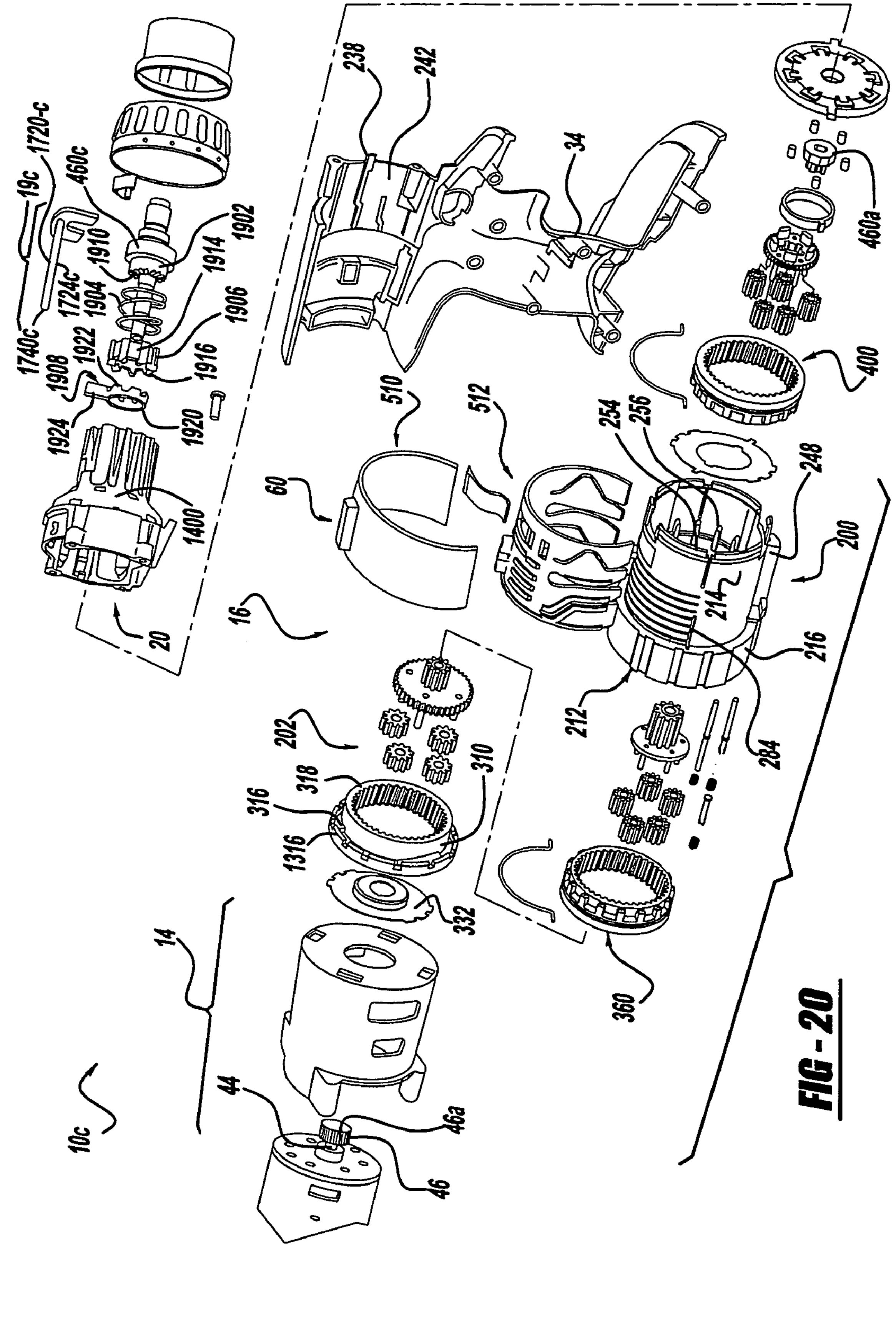
FIG. 20 is an exploded perspective view of a portion of a fourth power tool constructed in accordance with the teachings of the present invention.
Figure 21:
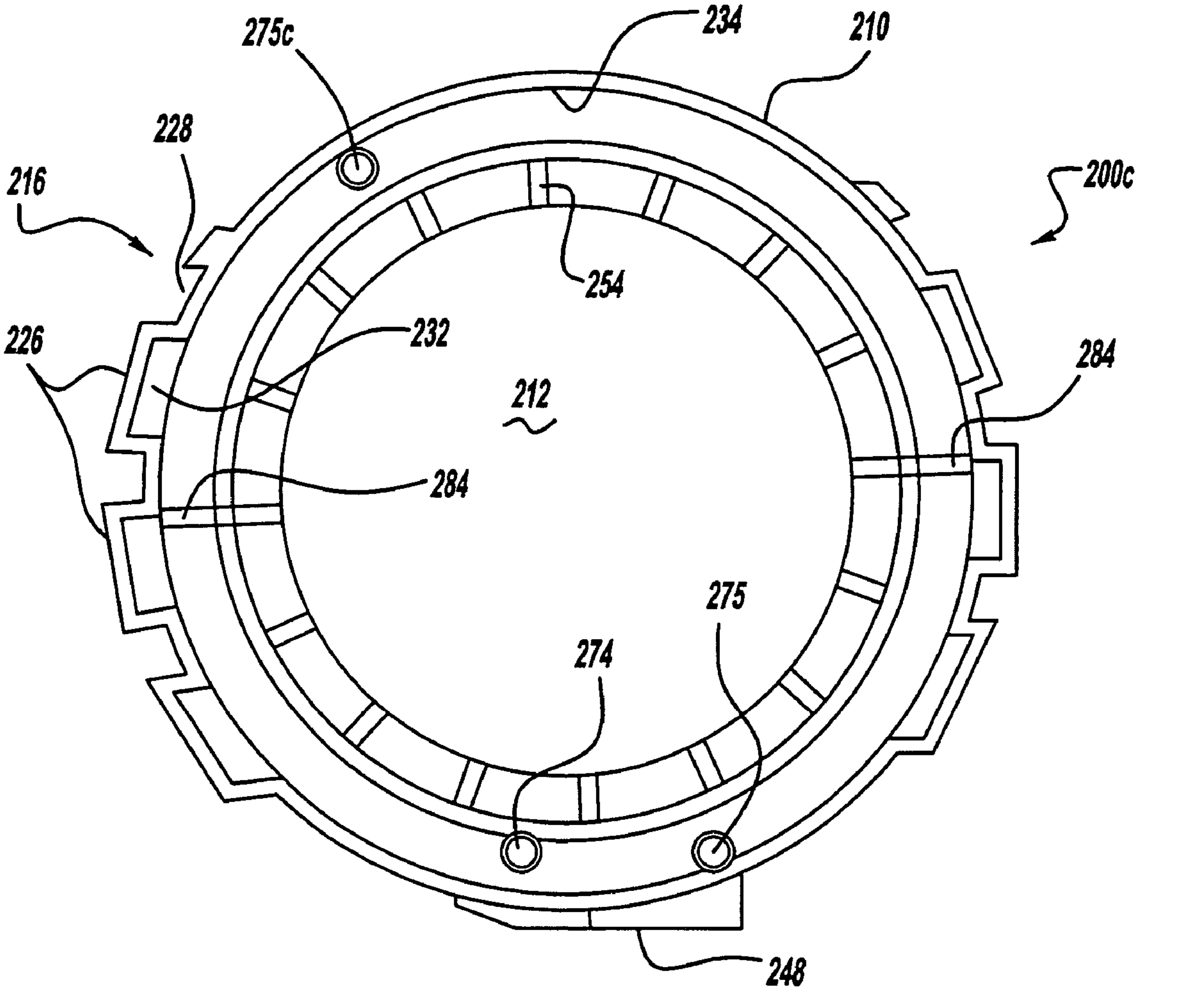
FIG. 21 is a rear view of a portion of the power tool of FIG. 20 illustrating the transmission sleeve in greater detail.
Figure 22:
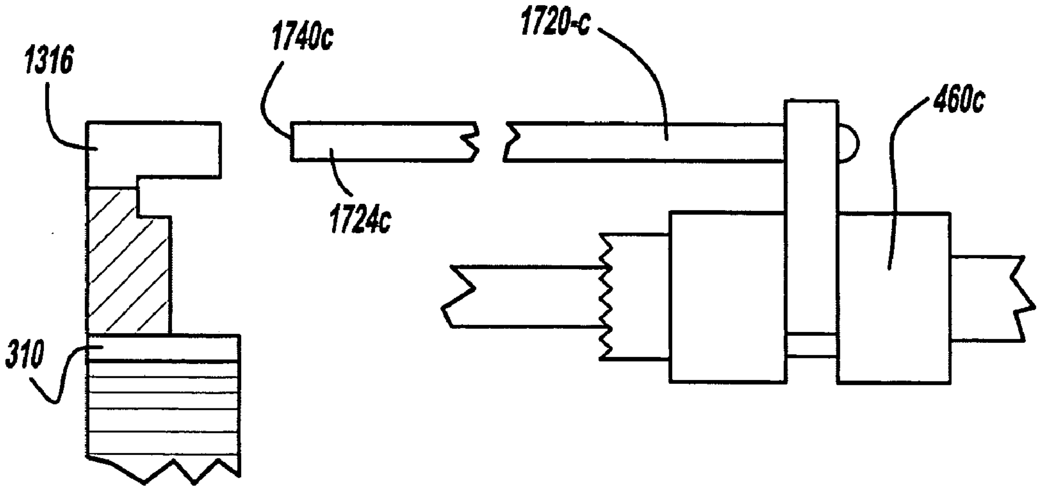
FIG. 22 is a schematic illustration of a portion of the power tool of FIG. 20 illustrating the second pin member in a spaced apart condition relative to the locking features on the first ring gear.
Figure 23:
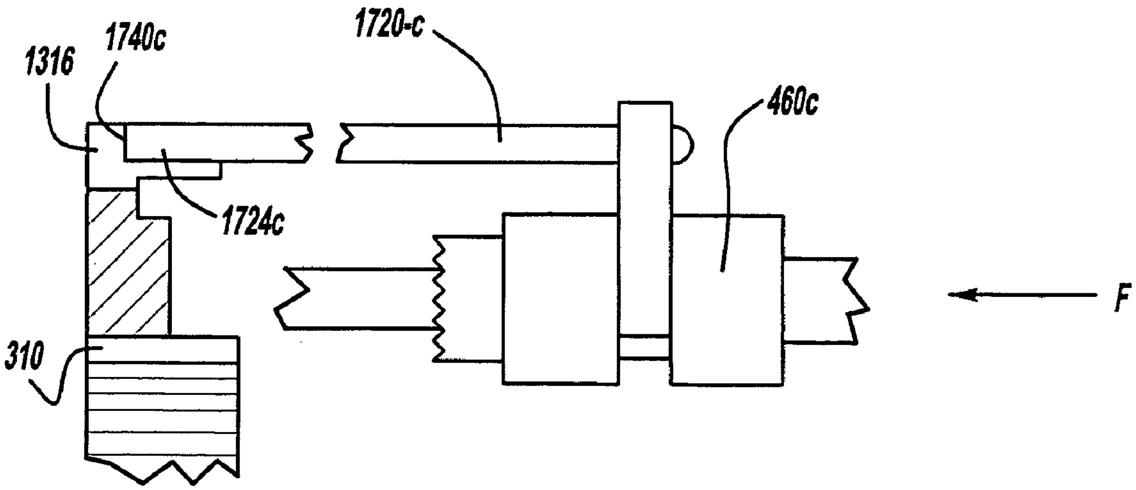
FIG. 23 is a schematic illustration similar to that of FIG. 22 but illustrating the second pin member engaged to the locking features on the ring gear when the hammer mechanism is activated and a rearwardly force is applied to output spindle.

In the example of FIGS. 18 and 19, a third hammer drill driver constructed in accordance with the teachings of the present invention is generally indicated by reference numeral 10*b*. The hammer drill driver 10*b* is generally similar to the hammer drill driver 10*a* except that the hammer activation tab 1781*b* can be associated with the setting collar 762*b* (e.g., formed on the first adjustment structure 760*b*) rather than with the second setting collar 1762*b*.

To operate the hammer drill driver 10*b* in a screwdriver mode (i.e., with the clutch assembly 18*b* in an "active" condition that is capable of limiting the torque that is transmitted to the output spindle 460), the second setting collar 1762*b* is positioned at a first location wherein the pin member 1720 is disengaged from the locking features 1316 and the setting collar 762*b* can be rotated to any one of a plurality of torque settings to thereby position the first adjustment structure 760*b* at a predetermined one of the adjustment segments 772, 774 or 776 to selectively adjust the clutch force. To operate the hammer drill driver 10*b* in a drill mode (i.e., with the clutch assembly 18*b* in a "bypassed" condition), the second setting collar 1762*b* is positioned at a second location wherein the pin member 1720 is engaged to the locking features 1316 to inhibit rotation of the first ring gear 310. To operate the hammer drill driver 10*b* in a hammer drill mode, the setting collar 762*b* is positioned at a hammer activation setting, which causes the hammer activation tab 1781*b* associated with the setting collar 762*b* to index the second cam 1906 (FIG. 3) forwardly in the gearcase 1400 (FIG. 3). In this example, the hammer drill driver 10*b* may be operated in a fourth mode in which the clutch assembly 18*b* is in an active condition and the hammer mechanism 19*b* is activated. In this regard, the setting collar 762*b* is positioned at the hammer activation setting, while the second setting collar 1762*b* is positioned at the first location wherein the pin member 1720 is disengaged from the locking features 1316. This fourth mode of operation may be useful, for example, in removing threaded fasteners where removal of the fastener has been rendered more difficult through corrosion or the application of a thread-locking substance, such as Loctite®, to the fastener.

Those of ordinary skill in the art will appreciate from this disclosure that as the clutch assembly 18 may be bypassed in both the drill mode and the hammer drill mode, the magnitude of the clutch force may be set at the maximum clutch force (i.e., a force that can be associated with the adjustment segment 774), a minimum clutch force (i.e., a force that can be associated with the adjustment segment 772) or a force that is between the maximum clutch force and the minimum clutch force (i.e., a force that can be associated with one of the intermediate adjustment segments 776).

Those of ordinary skill in the art will also appreciate from this disclosure that as the setting collar 762*b* and the second setting collar 1762*b* may interact with one another to some degree to discourage or prevent an operator from operating the hammer drill driver 10*b* in the fourth mode. By way of example, the setting collar 762*b* and the second setting collar 1762*b* may be "keyed" to one another to inhibit the movement of one of the collars if the other one of the collars is not set to a predetermined mode or position. Keying of the collars may be effected through pins or other translating elements that may be employed to engage the collars. In this regard, the translating elements may inhibit rotation of the setting collar 762*b* from a torque setting into the hammer activation setting if the second setting collar 1762*b* is not first set into the drill position. Rotation of the second setting collar 1762*b* into the drill position may cause a set of the translating elements to retract from the setting collar 762*b* so that mating elements associated with the setting collar 762*b* will not contact the translating elements when the setting collar is rotated into a position that activates the hammer mechanism 19*b*.

Similarly, the translating elements may inhibit rotation of the second setting collar 1762*b* from the drill position to the screwdriver position if the setting collar 762*b* is set to a position that activates the hammer mechanism 19*b*. Rotation of the setting collar 762*b* in a position that activates the hammer mechanism 19*b* may cause another set of translating elements to extend rearwardly from the setting collar 762*b* into a position where they may engage mating elements associated with the second setting collar 1762*b* to thereby inhibit rotation of the second setting collar 1762 from the drill position into the screwdriver position.

In the example of FIGS. 20 through 23, a fourth hammer drill driver constructed in accordance with the teachings of the present invention is generally indicated by reference numeral 10*c*. The hammer drill driver 10*c* is generally similar to the hammer drill driver 10*b* except that it includes a second pin member 1720-*c* that may be axially translated to engage to the locking features 1316 to inhibit rotation of the first ring gear 310. In the example provided, the second pin member 1720-*c* is located generally parallel to the output spindle 460*c* and is partially housed in an actuator aperture 275-*c* in the transmission sleeve 200*c* that can be similar to the second actuator aperture 275. The second pin member 1720-*c* can be coupled to the output spindle 460*c* so as to translate with output spindle 460*c*. The second pin member 1720-*c* and can include a follower 1724*c* with an end portion 1740*c* that can be formed to engage the locking features 1316 that are formed on the clutch member 700.

Operation of the hammer drill driver 10*c* in the screwdriver mode and the drill mode is generally similar to the operation of the hammer drill driver 10*b* in these modes and as such, will not be discussed in further detail except to note that rearward movement of the output spindle 460*c* is substantially inhibited. Operation of the hammer drill driver 10*c* in a mode wherein the hammer mechanism 19*c* is activated, however, permits the output spindle 460*c* to translate rearwardly so that the second pin member 1720-*c* may also translate rearwardly and engage the locking features 1316 on the clutch member 700 when force is applied to the tool to drive the output spindle 460*c* rearwardly (in the direction of the arrow F in FIG. 23). When the hammer drill driver 10*c* is operated in the hammer drill mode, the pin member 1720 is engaged to the locking features 1316 and as such, the engagement of the second pin member 1720-*c* to the locking features 1316 is redundant. When the hammer drill driver 10*c* is operated in the fourth mode, however, the pin member 1720 is disengaged from the locking features 1316 and consequently, the second pin member 1720-*c* is employed to bypass the clutch assembly 18*c* when the operator is applying force to the tool that causes the output spindle 460*c* to translate rearwardly against the bias of the spring 1904. Accordingly, the fourth mode of operation is also a hammer drill mode, but entails the bypassing of the clutch assembly 18*c* only when a force is applied to the tool that causes the output spindle 460*c* to translate rearwardly.

Figure 24:
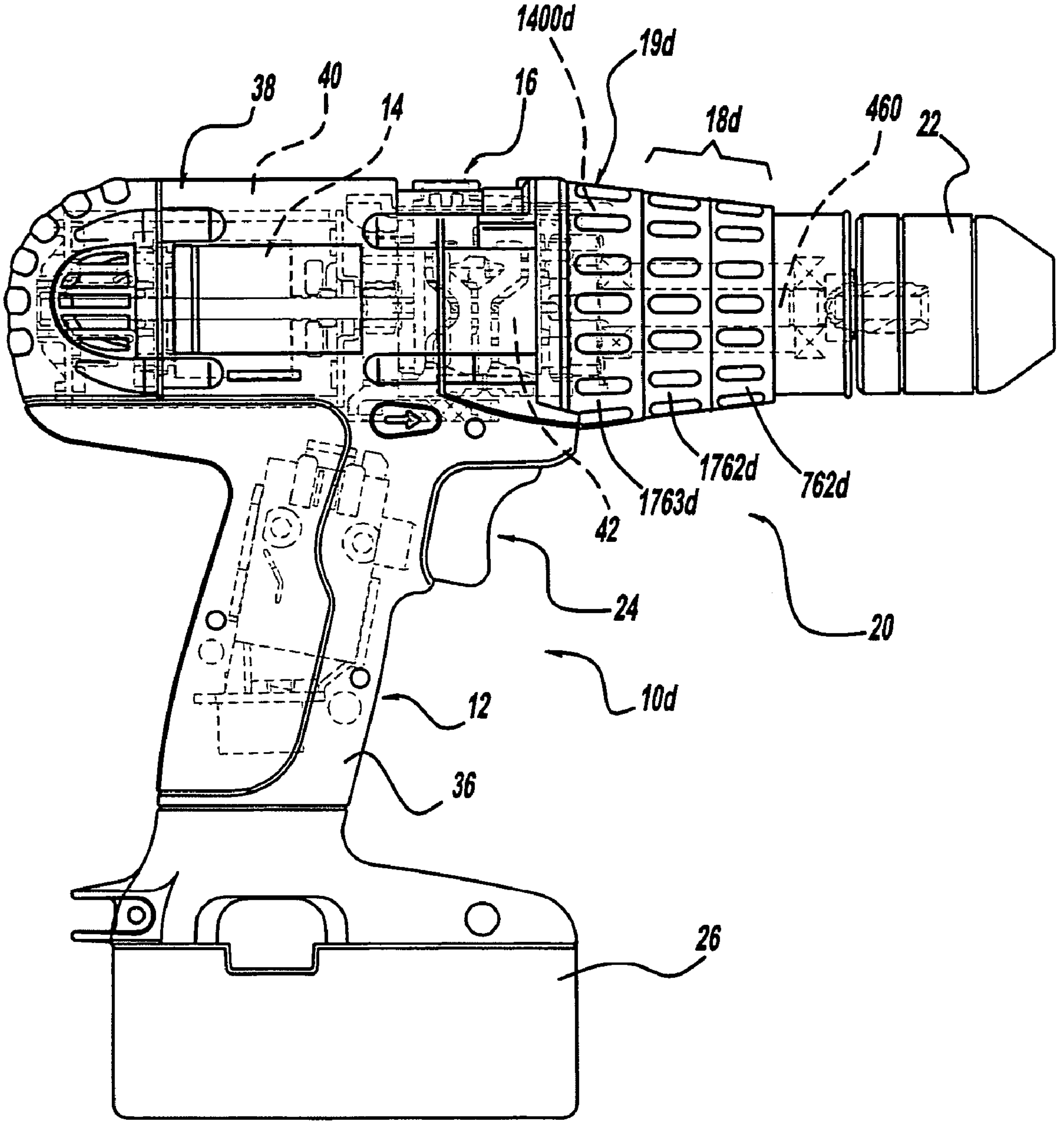
FIG. 24 is a side view of a fifth power tool constructed in accordance with the teachings of the present invention.
Figure 25:
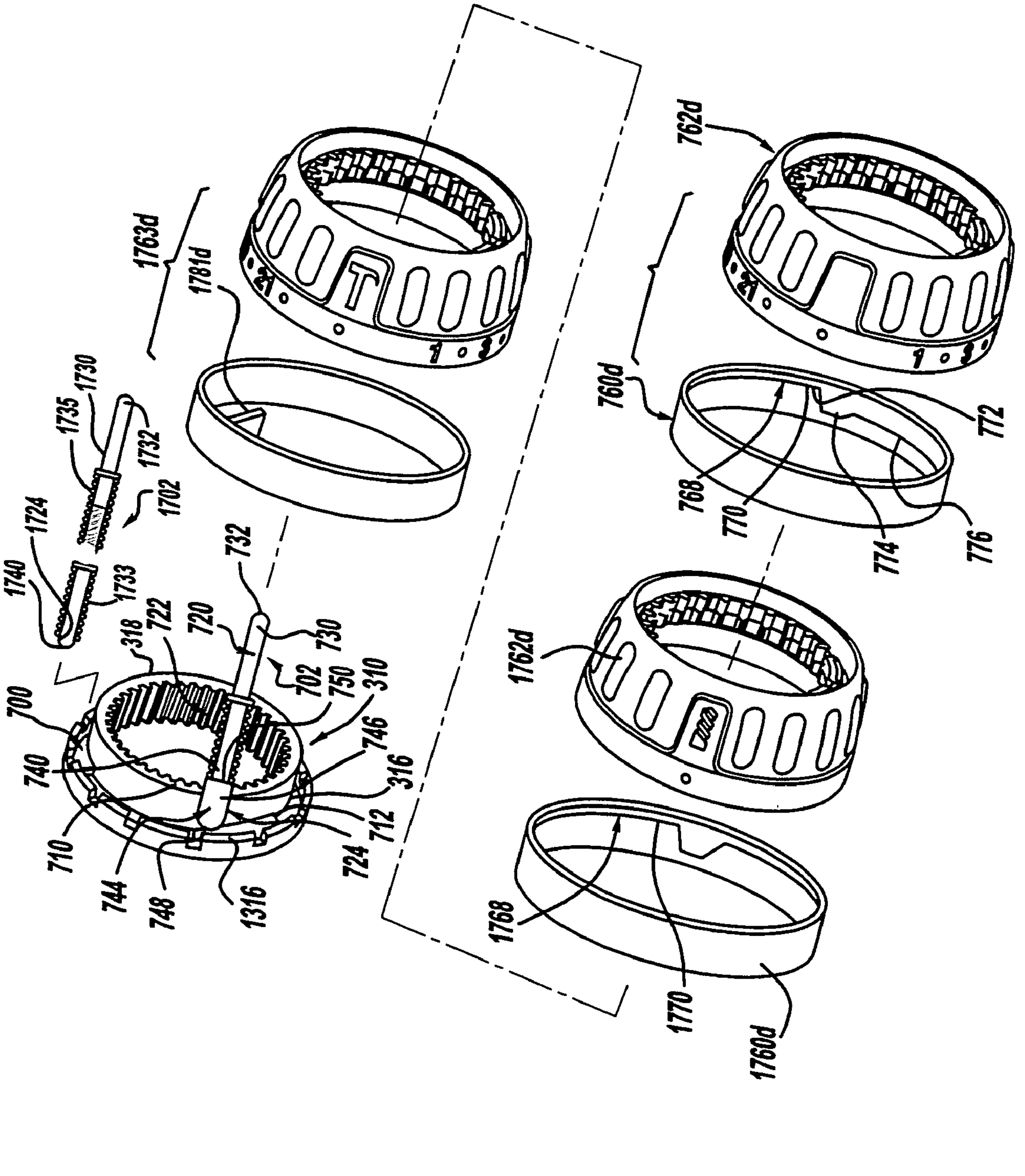
FIG. 25 is an exploded perspective view of a portion of the power tool of FIG. 8 illustrating the clutch mechanism and the hammer mechanism in greater detail.

In the example of FIGS. 24 and 25, a fifth hammer drill driver constructed in accordance with the teachings of the present invention is generally indicated by reference numeral 10*d*. The hammer drill driver 10*d* is generally similar to the hammer drill driver 10*a* except that the hammer activation tab 1781*d* can be associated with a third setting collar 1763*d* rather than with the setting collar 762*b*. Accordingly, the hammer drill driver 10*d* can include a setting collar 762*d*, which can be coupled to the first adjustment structure 760*d* and employed to set the clutch torque, a second setting collar 1762*d*, which can be coupled to the second adjustment structure 1760*d* and employed to bypass or activate the clutch assembly 18*d*, and the third setting collar 1763*d*, which can be associated with the hammer activation tab 1781*d* and employed to selectively activate the hammer mechanism 19*d*.

To operate the hammer drill driver 10*d* in the screwdriver mode, the second setting collar 1762*d* is positioned at a first location wherein the pin member 1720 is disengaged from the locking features 1316, the third setting collar 1763*d* is positioned at a location wherein the hammer mechanism 19*d* is inactivated and the setting collar 762*d* can be rotated to any one of a plurality of torque settings to thereby position the first adjustment structure 760*d* at a predetermined one of the adjustment segments 772, 774 or 776 to selectively adjust the clutch force. To operate the hammer drill driver 10*d* in the drill mode, the second setting collar 1762*d* is positioned at a second location wherein the pin member 1720 is engaged to the locking features 1316 to inhibit rotation of the first ring gear 310. To operate the hammer drill driver 10*d* in the hammer drill mode, the third setting collar 1763*d* is positioned at a hammer activation setting, which causes the hammer activation tab 1781*d* associated with the setting collar 1763*d* to index the second cam 1906 forwardly in the gearcase 1400*d*. In this example, the hammer drill driver 10*d* may be operated in a fourth mode in which the clutch assembly 18*d* is in an active condition and the hammer mechanism 19*d* is activated. In this regard, the third setting collar 1763*d* is positioned at the hammer activation setting, while the second setting collar 1762*d* is positioned at the first location wherein the pin member 1720 is disengaged from the locking features 1316.

Figure 26:
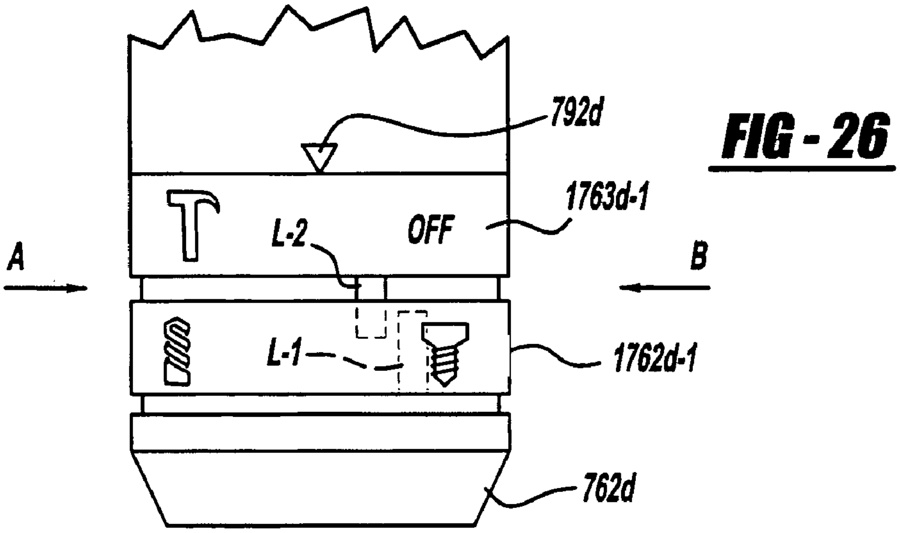
FIG. 26 is a top view of an alternate embodiment of the power tool of FIG. 24.

If operation of the hammer drill driver 10*d* in the fourth mode is not desirable, the industrial design of the tool may be configured to alert the user to the desired placement or positioning of the setting collars 762*d*, 1762*d* and 1763*d*. Additionally or alternatively, the hammer drill driver may be configured such that the second setting collar and the third setting collar interact with one another to inhibit the setting of the hammer drill driver in the fourth mode as shown in FIG. 26. In this example, the second setting collar 1762*d*-1 includes a projecting lug L-1 that is configured to engage a projecting lug L-2 that can be associated with the third setting collar 1763*d*-1. The second and third setting collars 1762*d*-1 and 1763*d*-1 can be set to a hammer drill mode through the alignment of the hammer symbol on the third setting collar 1763*d*-1 and the drill symbol on the second setting collar 1762*d*-1 to the arrow of the setting indicator 792*d*. In that condition, further rotation of the collars in the direction of arrow A from the points that are illustrated can be mechanically inhibited. If a user desires to set the tool into a drill mode, the user may simply rotate the third setting collar 1763*d*-1 into an “off” position where the hammer mechanism is de-activated. If the user desired to change from the hammer drill mode directly into the screwdriver mode, the user can rotate the second setting collar 1762*d*-1 to align the arrow of a setting indicator 792*d* to the screw symbol on second setting collar 1762*d*-1. As the lugs L-1 and L-2 engage one another, rotation of the second setting collar 1762*d*-1 in the direction of arrow B will cause corresponding rotation of the third setting collar 1763*d*-1 so that the hammer mechanism can be de-activated. Similarly, if the collars are set to a screwdriver mode and the user desires to set the tool into a hammer drill mode, the user can rotate the third setting collar 1763*d*-1 to align the arrow of the setting indicator 792*d* to an appropriate symbol on the third setting collar 1763*d*-1. As the lugs L-1 and L-2 engage one another, rotation of the third setting collar 1763*d*-1 in the direction of arrow A will cause corresponding rotation of the second setting collar 1762*d*-1 so that the clutch assembly will be bypassed.

Figure 27:
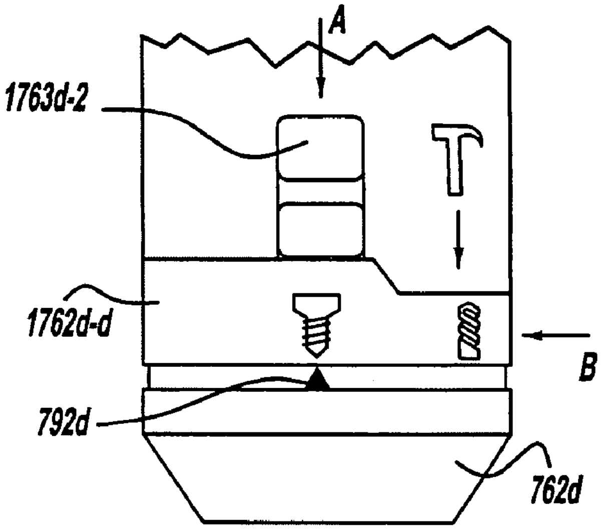
FIG. 27 is a top view of a second alternate embodiment of the power tool of FIG. 24.

In the example of FIG. 27, another example that employs three actuators to set the torque of the clutch assembly, the bypassed or active state of the clutch assembly and the activation or de-activation of the hammer mechanism is illustrated. In this example, the setting collar 762*d* can be employed to set the clutch force, the second setting collar 1762*d*-2 can be employed to bypass or activate the clutch assembly, and a slider switch 1763*d*-2 can be employed to activate or de-activate the hammer mechanism. Although not shown, the change from rotary actuation of the hammer mechanism to axial actuation of the hammer mechanism is well within the capabilities of one of ordinary skill in the art (see, e.g., U.S. Pat. No. 5,343,961 entitled Power Transmission Mechanism of Power-Driven Rotary Tools, issued Sep. 6, 1994, the disclosure of which is hereby incorporated by reference as if fully set forth herein).

As shown, the second setting collar 1762*d*-2 is positioned such that a screw symbol is aligned to the arrow of the setting indicator 792*d* and movement of the slider switch 1763*d*-2 in the direction of arrow A is inhibited through the construction of the second setting collar 1762*d*-2. Specifically, the axial width of the second setting collar 1762*d*-2 blocks movement of the slider switch 1763*d*-2 in the direction of arrow A so that the hammer mechanism cannot be activated. If operation of the tool in a drill mode is desired, the operator need only rotate the second setting collar 1762*d*-2 in the direction of arrow B.

Figure 28:
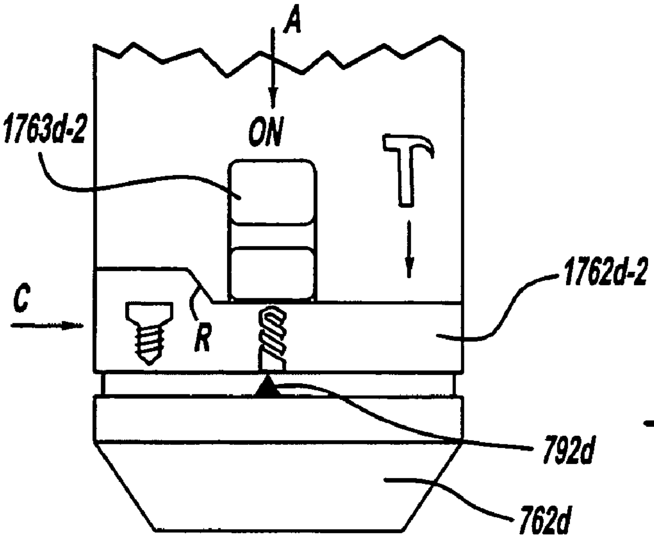
FIG. 28 is a top view of the power tool of FIG. 27, but illustrating the power tool as configured in a hammer drill mode.
Figure 29:
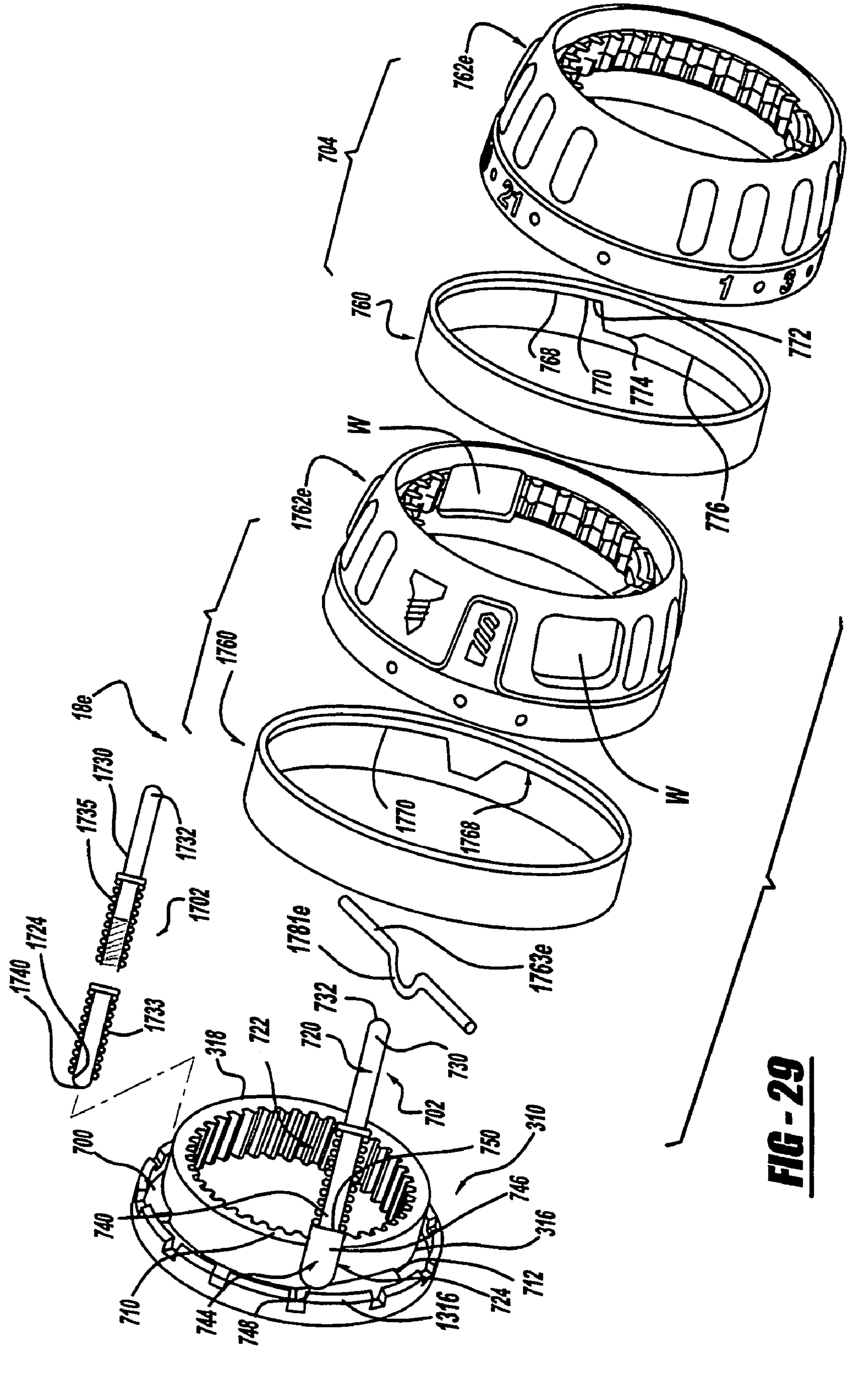
FIG. 29 is an exploded perspective view of a portion of a sixth power tool constructed in accordance with the teachings of the present invention.
Figure 30:
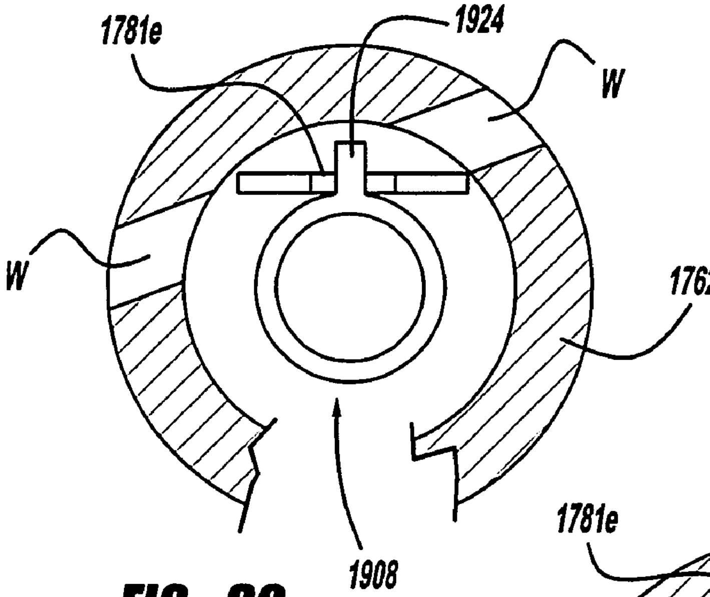
FIG. 30 is a section view through a portion of the power tool of FIG. 29 illustrating the respective positions of the second setting collar, the hammer activation slider and the actuator of the hammer mechanism when the second setting collar is positioned in a screwdriver mode position.

With reference to FIG. 28, if operation of the tool in a hammer mode is desired, the operator must first rotate the second setting collar 1762*d*-2 into the drill setting so that a relatively narrower portion of the second setting collar 1762*d*-2 is disposed in-line with the slider switch 1763*d*-2. The slider switch 1763*d*-2 may then be moved in the direction of arrow A to activate the hammer mechanism. If the hammer mechanism is activated and the user desires to operate the tool in the screwdriver mode, the user need only rotate the second setting collar 1762*d*-2 in the direction of arrow C as a ramp R that is formed on the second setting collar 1762*d*-2 will contact the slider switch 1763*d*-2 and urge the slider switch 1763*d*-2 in a direction opposite the arrow A.

Alternatively, an abrupt transition may be employed between the wide and narrow portions of the second setting collar 1762*d*-2 (e.g., the ramp R is removed so that a wall is formed generally parallel to the arrow A and generally perpendicular to the arrows B and C). In this arrangement, the slider switch 1763*d*-2 would abut the wall that forms the transition between the narrow and wide portions of the second setting collar 1762*d*-2 so that an operator would not be able to urge the slider switch 1763*d*-2 in the direction opposite arrow A through rotation of the second setting collar 1762*d*-2 in the direction of arrow C.

Figure 31:
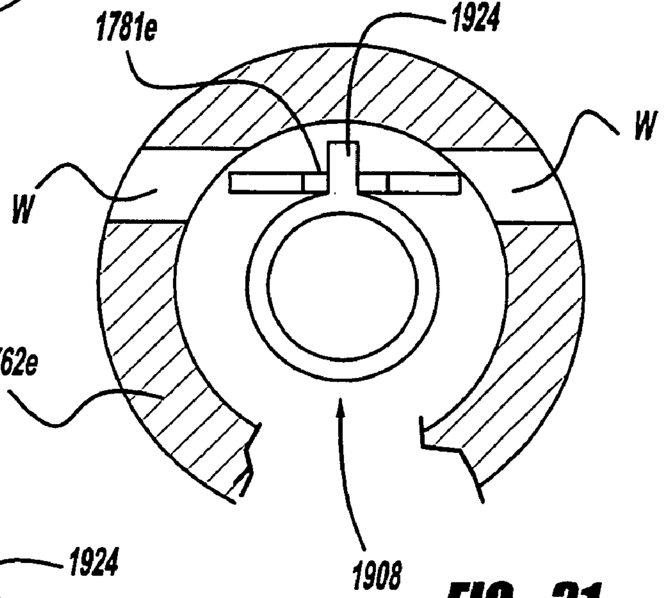
FIG. 31 is a section view similar to that of FIG. 30 but illustrating the respective positions of the second setting collar, the hammer activation slider and the actuator of the hammer mechanism when the second setting collar is positioned in a drill mode position.
Figure 32:
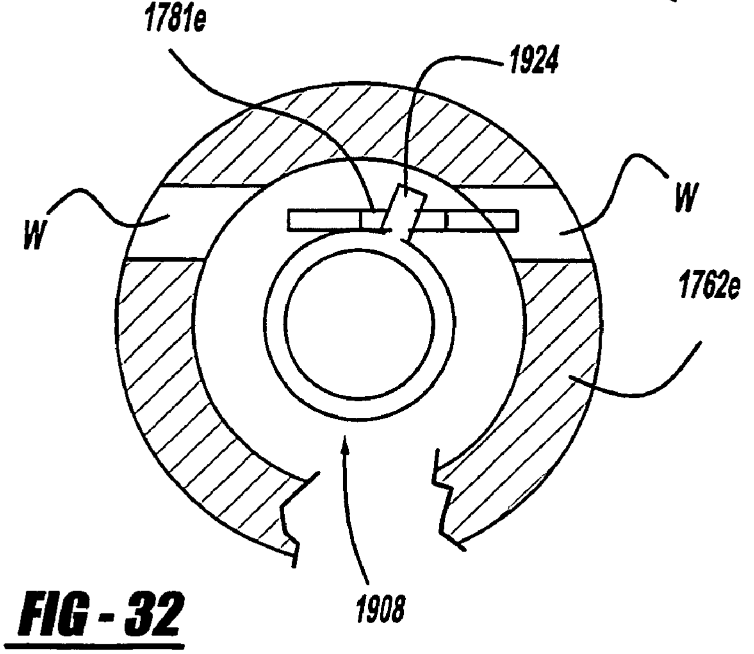
FIG. 32 is a section view similar to that of FIG. 30 but illustrating the respective positions of the second setting collar, the hammer activation slider and the actuator of the hammer mechanism when the second setting collar is positioned in a hammer drill mode position.

In the example of FIGS. 29 through 32, a sixth hammer drill driver constructed in accordance with the teachings of the present invention can include a setting collar 762*e*, which is employed to adjust the clutch torque, a second setting collar 1762*e*, which is employed to bypass or activate the clutch assembly, and a hammer activation slider 1763*e*, which is employed to activate or de-activate the hammer mechanism. In the example provided, the second setting collar 1762*e* includes a pair of windows W, while the hammer activation slider 1763*e* is received within the second setting collar 1762*e* and disposed generally transverse to a longitudinal axis of the hammer drill driver. The hammer activation slider 1763*e* includes a hook-shaped hammer activation tab 1781*e* that is configured to receive the actuator tab 1924 of the actuator 1908 of the hammer mechanism. With specific reference to FIG. 30, when the hammer drill driver is used in the screwdriver mode, the windows W in the second setting collar 1762*e* are not aligned to the hammer activation slider 1763*e* and as such, the hammer mechanism is maintained in a de-activated state. With reference to FIG. 31, when the hammer drill driver is used in the drill mode, the windows W in the second setting collar 1762*e* are aligned to the hammer activation slider 1763*e*. If operation of the hammer drill driver in a hammer drill mode is desired, the user need only insert their finger into the window W and push the hammer activation slider 1763*e* in the direction of arrow A to activate the hammer mechanism.

In the example provided, the hammer activation slider 1763*e* extends into one of the windows W when the hammer mechanism is activated and as such, the user is not able to rotate the second setting collar 1762*e* into the screwdriver mode position without first pushing the hammer activation slider 1763*e* in a direction opposite the arrow A to de-activate the hammer mechanism. Alternatively, the interior of the second setting collar 1762*e* may be configured with suitable features, such as ramps, which upon rotation of the second setting collar 1762*e* would contact the hammer activation slider 1763*e* and cause it to translate in a direction opposite to the direction arrow A.

Figure 33:
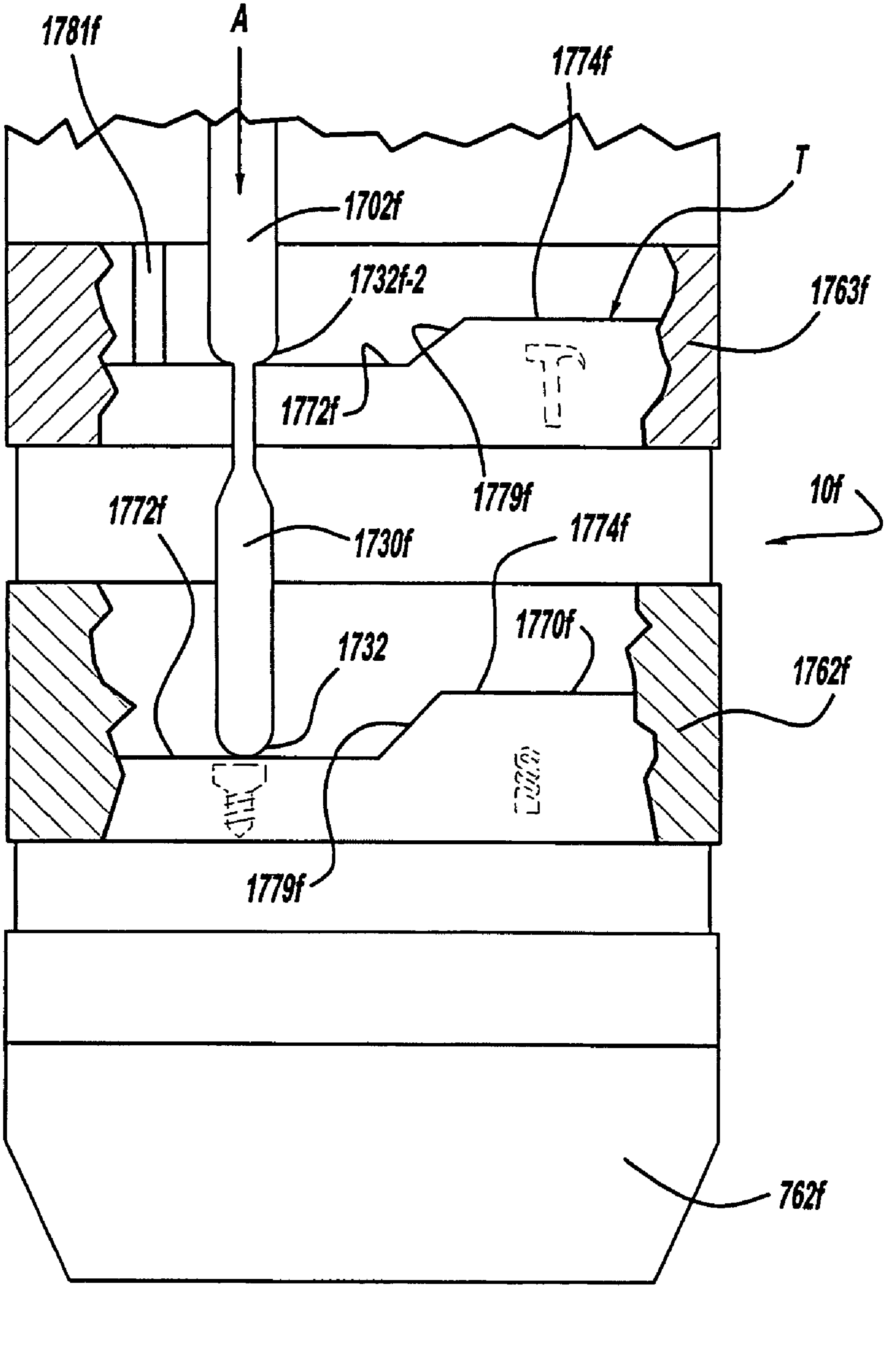
FIG. 33 is a top view in partial section of a portion of a seventh power tool constructed in accordance with the teachings of the present invention.

With reference to FIG. 33, a seventh hammer drill driver constructed in accordance with the teachings of the present invention is generally indicated by reference numeral 10*f*.

The hammer drill driver 10*f* can include a setting collar 762*f*, which can be employed to selectively adjust the clutch torque, a second setting collar 1762*f*, which can be employed to bypass or activate the clutch mechanism, and a third setting collar 1763*f*.

The second engagement assembly 1702*f* can include a pin that is similar in construction to that which is employed in the embodiments described above except that the cylindrical body portion 1730*f* includes a second tip portion 1732*f*-2 that is configured to engage a second adjustment profile T that is associated with the third setting collar 1763*f*. The second adjustment profile T can be generally similar to the adjustment profile 1770*f* that is associated with the second setting collar 1762*f* and can include a first adjustment segment 1772*f*, a last adjustment segment 1774*f*, a ramp section 1779*f* that is disposed between the first adjustment segment 1772*f* and the last adjustment segment 1774*f*. The hammer activation tab 1781*f* can also be associated with the third setting collar 1763*f*.

When the hammer drill driver 10*f* is to be employed in a screwdriver mode, the second and third setting collars 1762*f* and 1763*f* are rotated such that the tip portion 1732*d* and the second tip portion 1732*f*-2 contact the first adjustment segment 1772*f* of the adjustment profile 1770*f* and the second adjustment profile T, respectively. In this condition, the pin of the second engagement assembly 1702*f* does not extend in the direction opposite the arrow A sufficiently to engage the locking elements 1316 (FIG. 3) on the first ring gear 310 (FIG. 3) and the hammer activation tab 1781*f* does not contact the actuator 1908 (FIG. 3) to activate the hammer mechanism.

When the hammer drill driver 10*f* is to be employed in a drill mode, the second setting collar 1762*f* is rotated such that the tip portion 1732*f* contacts the last adjustment segment 1774 of the adjustment profile 1770*f* to urge the pin of the second engagement assembly 1702*f* in the direction opposite the arrow A to engage the pin to the locking elements 1316 (FIG. 3) on the first ring gear 310 (FIG. 3). As the third setting collar 1763*f* is not rotated, the hammer activation tab 1781*f* does not contact the actuator 1908 (FIG. 3) to activate the hammer mechanism.

When the hammer drill driver 10*f* is to be employed in the hammer drill mode, the third setting collar 1763*f* is rotated to cause the hammer activation tab 1781*f* to rotate the actuator 1908 and activate the hammer mechanism. Significantly, if the second setting collar 1762*f* is not in the drill position when the third setting collar 1763*f* is rotated to activate the hammer mechanism, rotation of the third setting collar 1763*f* will align the second tip portion 1732*f*-2 with the last first adjustment segment 1774*f* of the second adjustment profile T, which causes the pin of the second engagement assembly 1702*f* to travel in the direction opposite the arrow A to engage the pin to the locking elements 1316 (FIG. 3) on the first ring gear 310 (FIG. 3).

Figure 34:
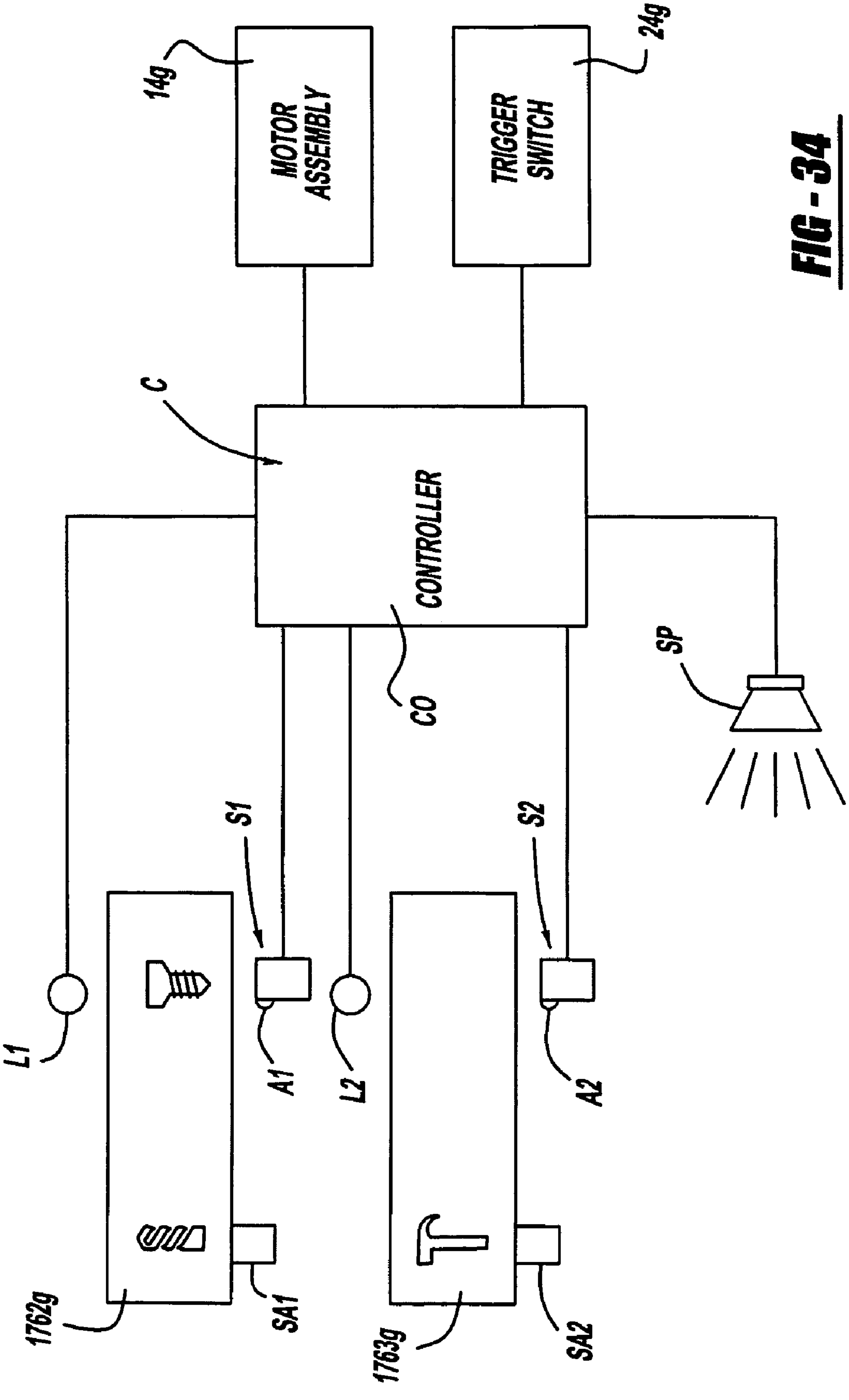
FIG. 34 is a schematic illustration of an eighth power tool constructed in accordance with the teachings of the present invention.

With reference to FIG. 34, a portion of an eighth hammer drill driver constructed in accordance with the teachings of the present invention is illustrated to include a second setting collar 1762*g*, which can be employed to bypass or activate the clutch assembly, a third setting collar 1763*g*, which can be employed to activate or de-activate the hammer mechanism and a controller C. The controller C can include a control unit CU, a first switch S1, a second switch S2, a first light L1, a second light L2 and a speaker SP. The second setting collar 1762*g* can include a switch actuator SA1 that can contact an actuator A1 on the first switch S1 when the second setting collar 1762*g* is positioned at a location that bypasses the clutch assembly. Similarly, the third setting collar 1763*g* can include a switch actuator SA2 that can contact an actuator A2 on the second switch S2 when the third setting collar 1763*g* is positioned at a location that activates the hammer mechanism. Contact between the switch actuator (e.g., SA1) and the actuator (e.g., A1) of an associated switch (e.g., S1) causes the switch to produce a switch signal that is received by the control unit CU and as such, the control unit CU can be configured to identify the position of each of the second and third setting collars 1762*g* and 1763*g* based upon the signals that are received from the first and second switches S1 and S2.

Accordingly, the control unit CU can identify situations wherein the second setting collar 1762*g* is positioned such that the clutch assembly is active and the third setting collar 1763*g* is positioned such that the hammer mechanism is active. In such situations, the control unit CU may be employed to immediately or upon the actuation of the trigger assembly 24*g* (i.e., pressing of the trigger switch) perform one or more of the following: a) generate a visual alarm by illuminating one or more of the lights L1 and L2 in either a continuous manner or in a pattern that is indicative of a coded error message; b) generate an audio alarm with the speaker SP; and c) inhibiting the operation of the motor assembly 14*g*.

Figure 35:
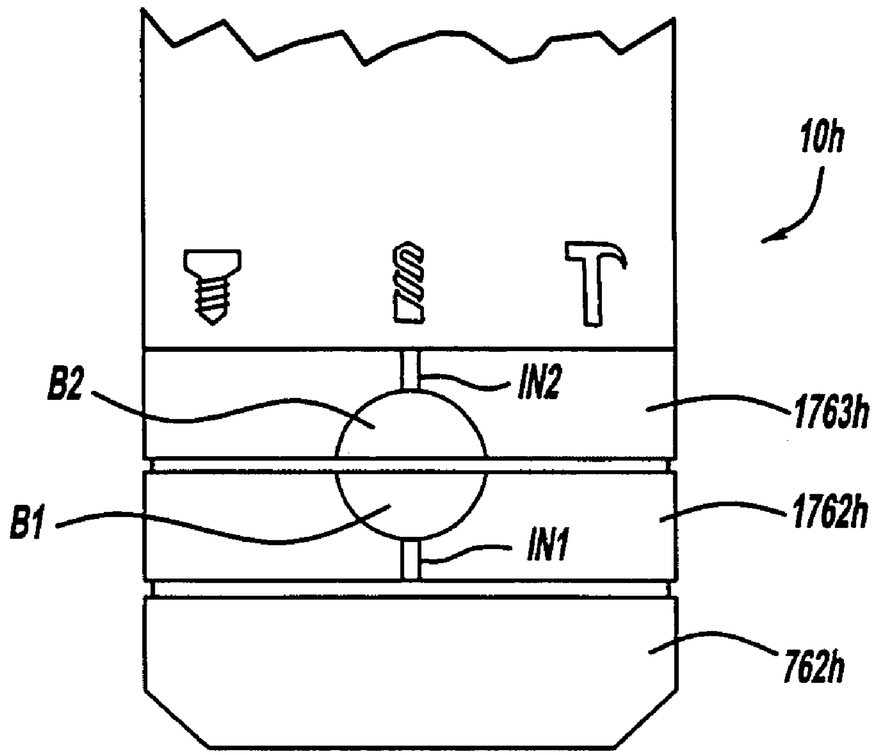
FIG. 35 is a top view a portion of a ninth power tool constructed in accordance with the teachings of the present invention.

With reference to FIG. 35, a portion of a ninth hammer drill driver 10*h* constructed in accordance with the teachings of the present invention is illustrated to include a setting collar 762*h*, which can be employed to selectively adjust the clutch torque, a second setting collar 1762*h*, which can be employed to bypass or activate the clutch assembly, and a third setting collar 1763*h*, which can be employed to activate or de-activate the hammer mechanism. In the particular example provided, each of the second and third setting collars 1762*h* and 1763*h* is rotate-able independently of the other and as such, the hammer drill driver 10*h* may be operated in the fourth mode (i.e., with the clutch assembly and hammer mechanism both in an active condition). To prevent the hammer drill driver 10*h* from being inadvertently operated in the fourth mode each of the second and third setting collars 1762*h* and 1763*h* includes a button portion B1 and B2, respectively, that can be contoured such that a finger (e.g., index finger) or thumb of an operator co-engages the second and third setting collars 1762*h* and 1763*h* so that they may be simultaneously rotated between a screwdriver position, a drill position and a hammer drill position. It will be appreciated that the second setting collar 1762*h* effectively has two drill positions, wherein the clutch assembly is bypassed when the setting indicia IN1 on the second setting collar 1762*h* is positioned in-line with either the drill symbol or the hammer symbol. It will likewise be appreciated that the third setting collar 1763*h* effectively has two de-activated positions, wherein the hammer mechanism is de-activated when the setting indicia IN2 on the third setting collar 1763*h* is positioned in-line with either the screw symbol or the drill symbol.

Figure 36:
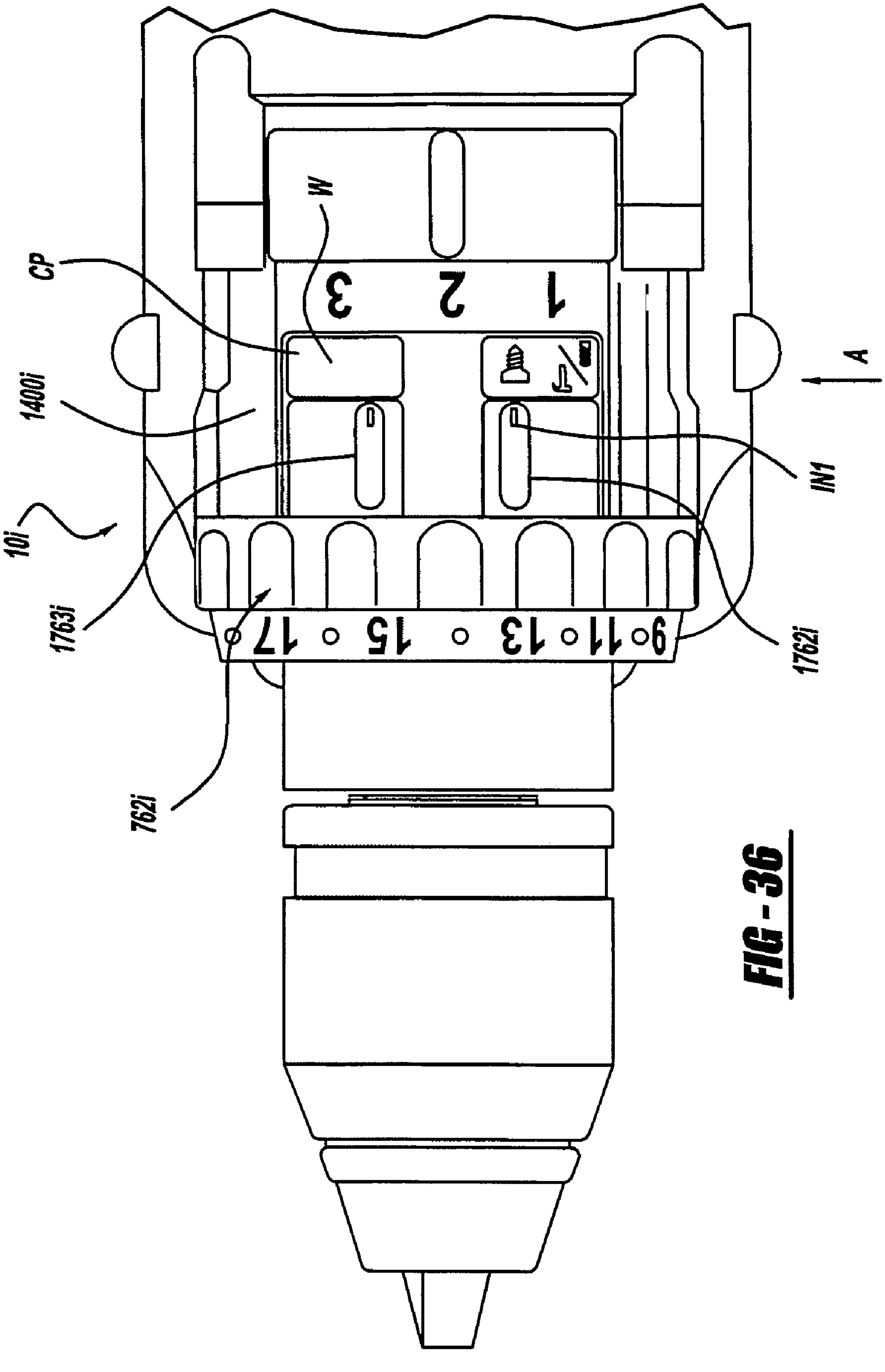
FIG. 36 is a top view of a portion of a tenth power tool constructed in accordance with the teachings of the present invention.

While several of the above-described hammer drill drivers employ were been described above as employing "collars" to bypass or activate the clutch assembly or to activate or de-activate the hammer mechanism, those of ordinary skill in the art will appreciate that the invention, in its broadest aspects, may be constructed somewhat differently. For example, partial collars may be employed to bypass or activate the clutch assembly and/or to activate or de-activate the hammer mechanism as shown in the example of FIG. 36. In this example, the hammer drill driver 10*i* can include a setting collar 762*i*, which can be employed to selectively adjust the clutch torque, a second collar portion or setting slider 1762*i*, which can be employed to bypass or activate the clutch assembly, and a third collar portion or setting slider 1763*i*, which can be employed to activate or de-activate the hammer mechanism.

Figure 37:
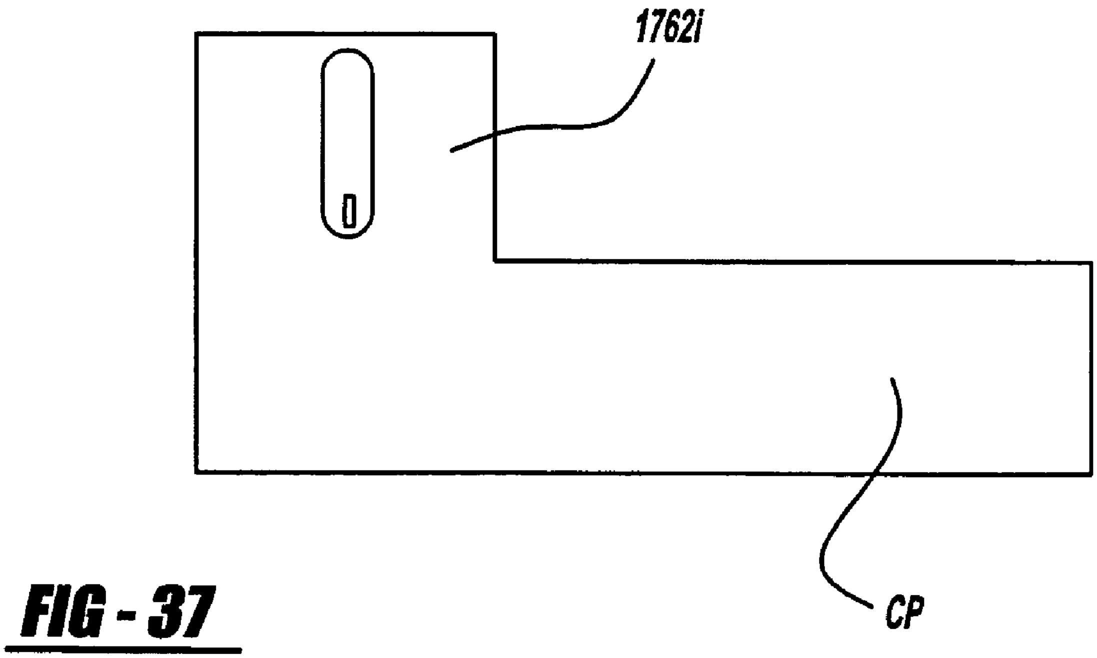
FIG. 37 is a view of a portion of the power tool of FIG. 36 illustrating the second setting slider in more detail.

With additional reference to FIG. 37, the second setting slider 1762*i* can be generally L-shaped, having a cover portion CP that can be employed to cover a portion of the third setting slider 1763*i* as will be described in more detail below. It should be appreciated that each of the second and third setting sliders 1762*i* and 1763*i* is rotate-able independently of the other and as such, the hammer drill driver 10*i* may be operated in the fourth mode (i.e., with the clutch assembly and hammer mechanism both in an active condition). Alternatively, the second and third setting sliders 1762*i* and 1763*i* may be configured to interact with one another to inhibit operation of the hammer drill driver 10*i* in the fourth mode.

When the hammer drill driver 10*i* is to be operated in the screwdriver mode, the second setting slider 1762*i* is translated or rotated in the direction of arrow A such that the setting indicator IN1 on the second setting slider 1762*i* is positioned in-line with a screw symbol and the third setting slider 1763*i* is translated or rotated in a direction opposite the arrow A. It should be appreciated that the cover portion CP of the second setting slider 1762*i* overlies a portion of the gearcase 1400*i* beneath a window W1 that is formed in the gearcase 1400*i*.

Figure 38:
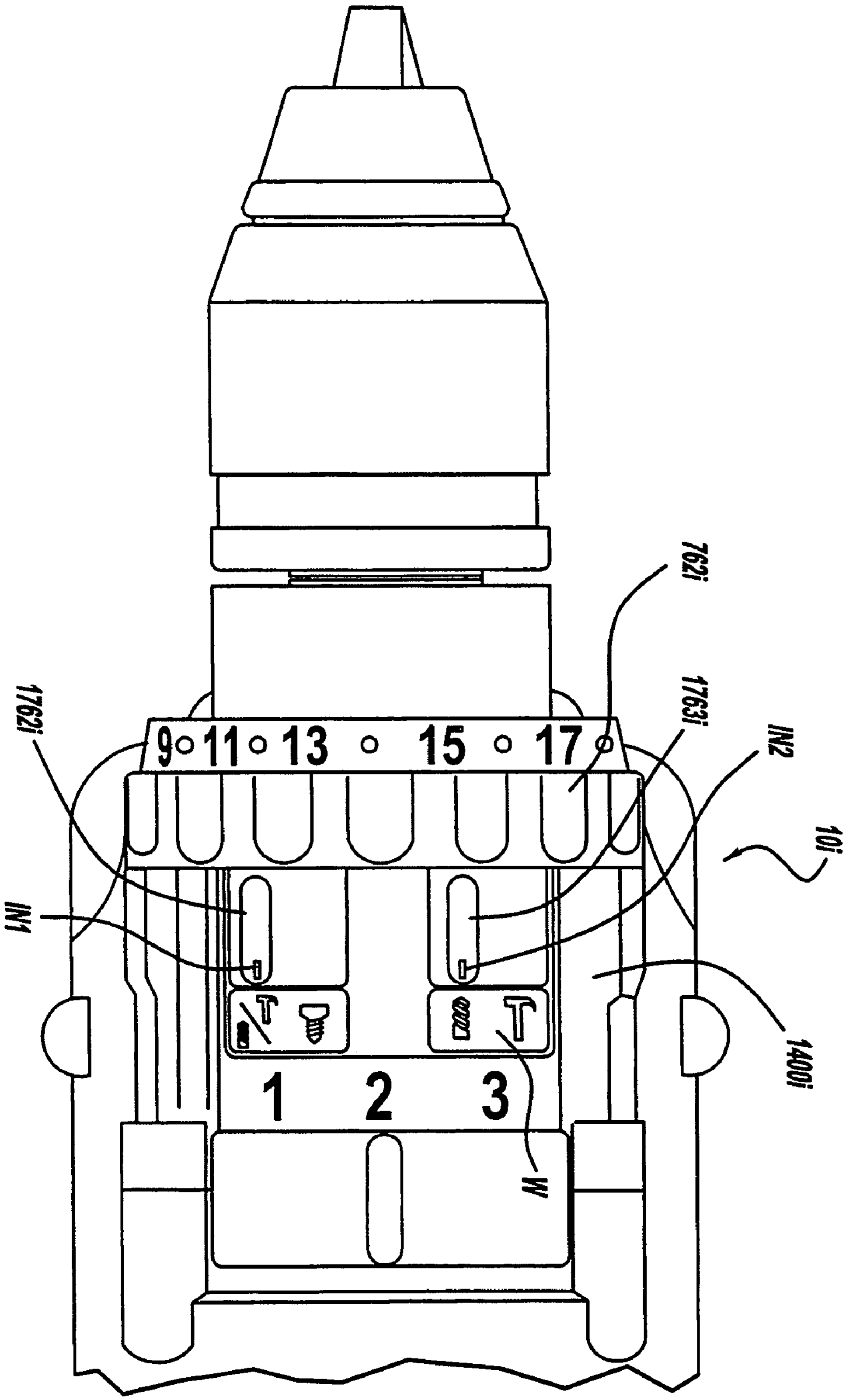
FIG. 38 is a view similar to that of FIG. 38 but illustrating the power tool as configured in a drill setting.

With reference to FIG. 38, when the hammer drill driver 10*i* is to be operated in the drill mode or hammer drill mode, the second setting slider 1762*i* is translated or rotated in the direction opposite arrow A such that the setting indicator IN1 on the second setting slider 1762*i* is positioned in-line with a drill and hammer symbol. It should be appreciated that the cover portion CP (FIG. 37) of the second setting slider 1762*i* does not overlie the portion of the portion of the gearcase 1400*i* beneath the window W1 and as such, a drill symbol and a hammer symbol are exposed in the window W1. To operate the hammer drill driver 10*i* in the drill mode, the third setting slider 1763*i* is positioned such that the indicator IN2 is positioned in-line with the drill symbol in the window W1. To operate the hammer drill driver 10*i* in the hammer drill mode, the third setting slider 1763*i* is positioned such that the indicator IN2 is positioned in-line with the hammer symbol in the window W1.

Figure 39:
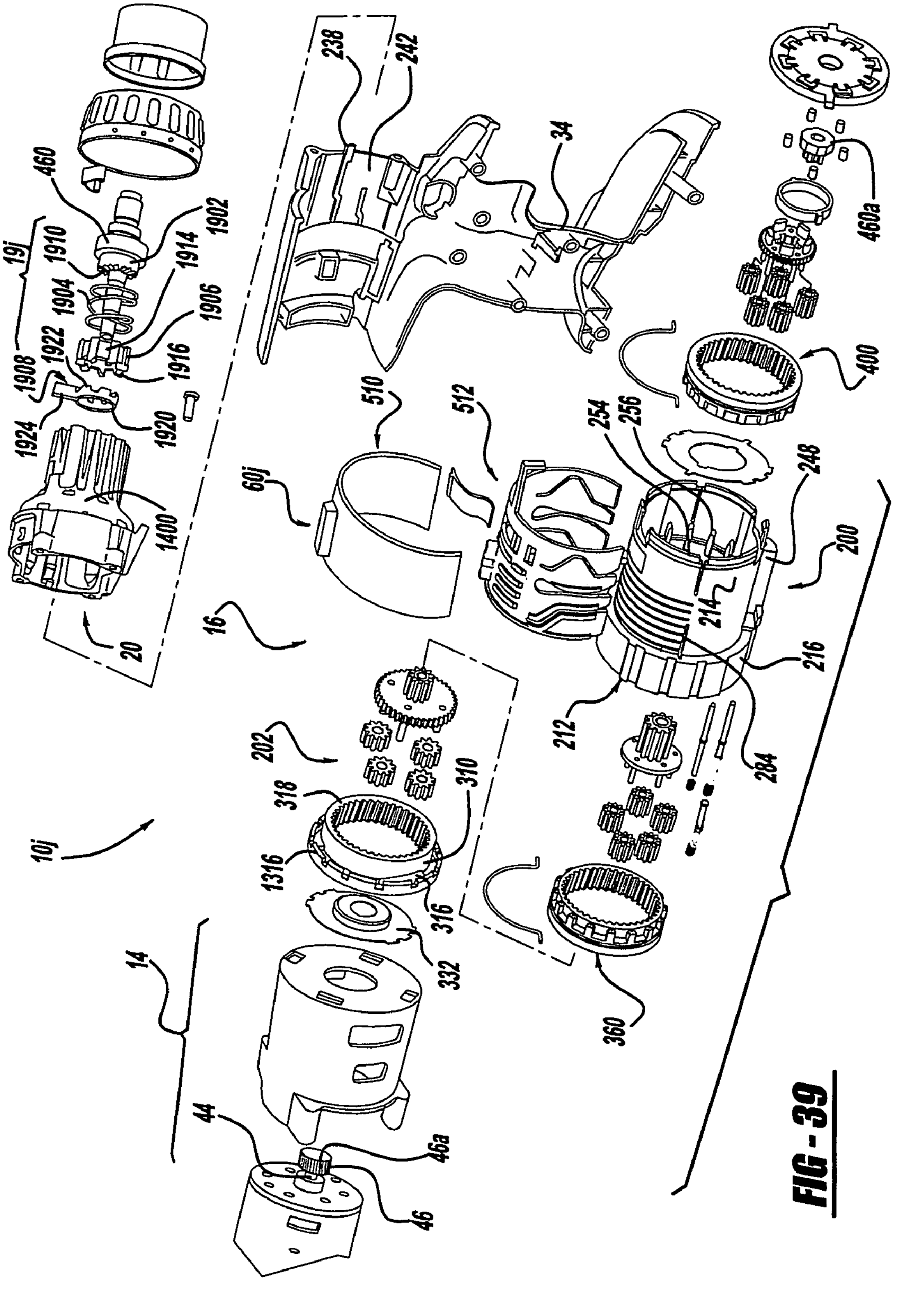
FIG. 39 is an exploded perspective view of a portion of an eleventh power tool constructed in accordance with the teachings of the present invention.
Figure 40:
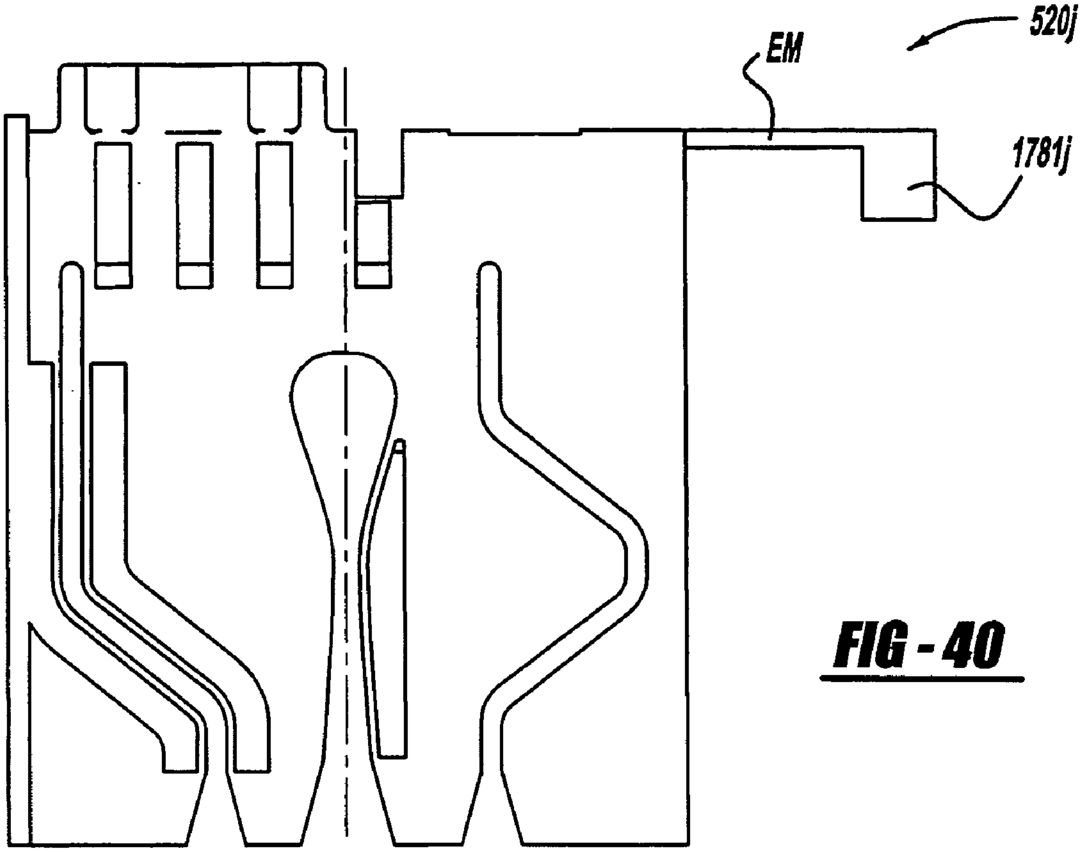
FIG. 40 is a side view of a portion of the power tool of FIG. 39, illustrating the rotary selector cam in more detail.
Figure 41:
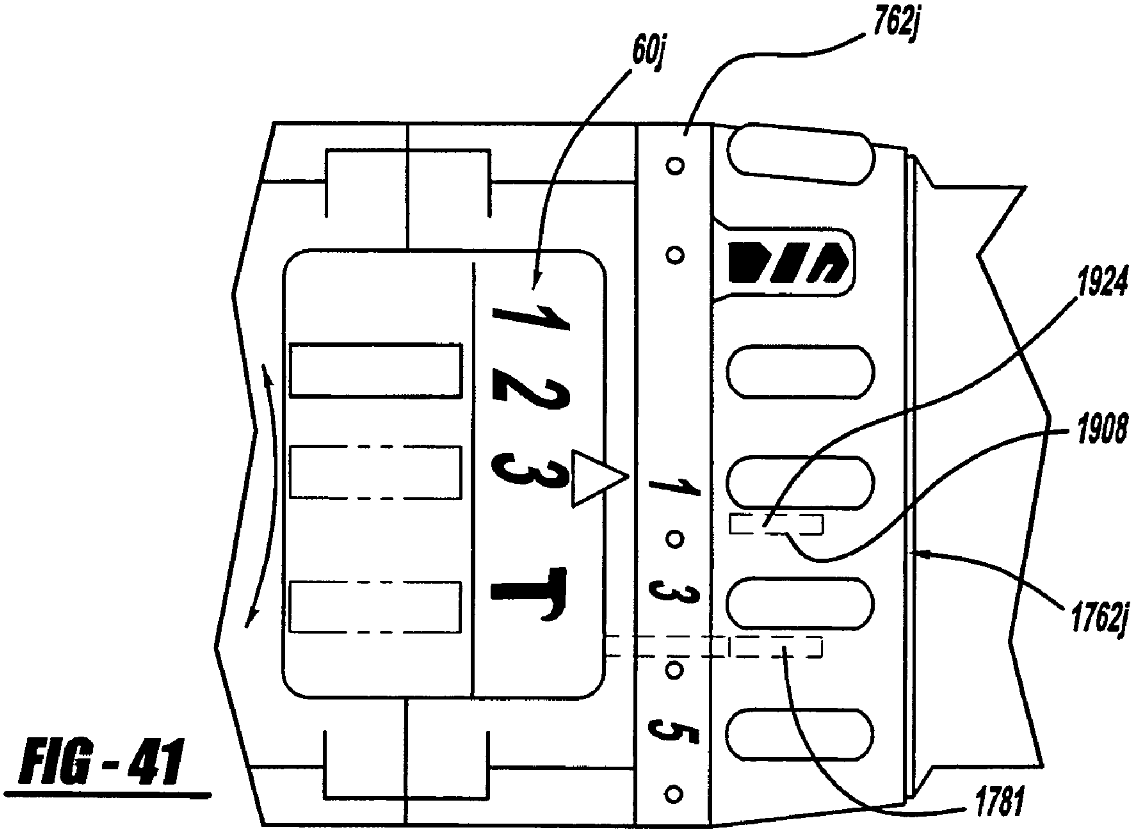
FIG. 41 is a top view of a portion of the power tool of FIG. 39.

In the example of FIGS. 39 through 41, an eleventh hammer drill driver constructed in accordance with the teachings of the present invention is generally indicated by reference numeral 10*j*. In this example, the hammer drill driver 10*j* can include a setting collar 762*j*, which can be employed to selectively adjust the clutch torque, and a second setting collar 1762*j*, which can be employed to bypass or activate the clutch assembly. Activation and de-activation of the hammer mechanism may be effected via the speed selector mechanism 60*j*. The speed selector mechanism 60*j* is generally identical to the speed selector 60 described above, except that the rotary selector cam 520*j* includes an extension member EM to which the hammer activation tab 1781*j* is coupled.

When the hammer drill driver 10*j* is to be operated in the hammer drill mode, the second setting collar 1762*j* is positioned to bypass the clutch mechanism in a manner that is similar to that which is described in the numerous embodiments above, and the speed selector 60*j* is positioned such that the hammer activation tab 1781*j* contacts the actuator tab 1924 and rotates the actuator 1908 to activate the hammer mechanism. It will be appreciated that construction of the hammer drill driver 10*j* in this manner permits the user to operate the hammer drill driver 10*j* in a hammer drill mode in only one speed ratio—in this case, the high speed ratio.

While the invention has been described in the specification and illustrated in the drawings with reference to various embodiments, it will be understood by those of ordinary skill in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A hammer drill/driver comprising:

a motor having an output member;

a planetary transmission receiving rotary power from the output member and producing a rotary output, the planetary transmission including a ring gear;

a clutch assembly having a clutch profile, which is coupled to the ring gear, and a first pin assembly having a first follower, a first pin member and a first spring that biases the first follower into contact with the clutch profile; and a clutch bypass having a bypass profile, which is coupled to the ring gear, and second pin assembly having a second follower, a second pin member, a second spring, which biases the second follower away from the bypass profile, and a third spring, which biases the second follower away from the second pin member.

2. The hammer drill/driver of claim 1, wherein the planetary transmission is a multi-stage transmission that provides at least three distinct speed ratios.

3. The hammer drill/driver of claim 2, wherein the ring gear is associated with a stage of the transmission that is closest to the motor.

4. The hammer drill/driver of claim 1, wherein the planetary transmission includes a transmission sleeve into which the ring gear is disposed.

5. The hammer drill/driver of claim 4, wherein the transmission sleeve includes a first longitudinally extending bore into which at least one of the first pin assembly and the second pin assembly is disposed.

6. The hammer drill/driver of claim 5, wherein the first pin assembly is disposed in the first longitudinally extending bore and wherein the transmission sleeve includes a second longitudinally extending bore into which the second pin assembly is disposed.

7. The hammer drill/driver of claim 1, wherein the clutch profile is disposed radially inwardly of the bypass profile.

8. The hammer drill/driver of claim 1, further comprising a mode setting switch and a torque selling switch and wherein the clutch bypass includes a third pin assembly having a third follower, a third pin member, a fourth spring, which biases the third follower away from the bypass profile, and a fifth spring, which biases the third follower away from the third pin member, the mode setting switch being operable for selling the hammer drill/driver into a first mode, wherein a rotary output is provided to an output spindle, and a second mode, wherein a rotary and percussive output is provided to the output spindle, the torque setting switch being operable for adjusting a force exerted by the first pin assembly onto the clutch profile, and wherein the second follower is moved into contact with the bypass profile when the hammer drill/driver is operated in the second mode.

9. The hammer drill/driver of claim 8, wherein the third follower is moved into contact with the bypass profile when the torque setting switch is set to a predetermined torque setting.

10. The hammer drill/driver of claim 9, wherein the predetermined torque setting is a maximum torque setting.

11. The hammer drill/driver of claim 9, wherein the predetermined torque setting is a minimum torque setting.

12. The hammer/drill driver of claim 8, wherein the mode setting switch is a rotary switch.

13. The hammer drill/driver of claim 8, wherein the torque setting switch is a rotary switch.

14. The hammer drill/driver of claim 1, wherein the hammer drill/driver is operable in a screwdriver mode, wherein a rotary output is provided to an output spindle and the second follower is spaced apart from the bypass profile, a drill mode, wherein a rotary output is provided to the output spindle and the second follower is engaged to the bypass profile to inhibit rotation of the ring gear, and a hammer drill mode, wherein a rotary and percussive output is provided to the output spindle and the second follower is engaged to the bypass profile to inhibit rotation of the ring gear.

15. A drill/driver comprising:

a motor having an output member;

a planetary transmission receiving rotary power from the output member and producing a rotary output, the planetary transmission including a ring gear;

a clutch assembly having a clutch profile, which is coupled to the ring gear, and a first pin assembly having a first follower, a first pin member and a first spring that biases the first follower into contact with the clutch profile; and a clutch bypass having a bypass profile, which is coupled to the ring gear, and second pin assembly having a second follower, a second pin member, a second spring, which biases the second follower away from the bypass profile, and a third spring, which biases the second follower away from the second pin member;

wherein the planetary transmission includes a transmission sleeve into which the ring gear is disposed, wherein the transmission sleeve includes a first longitudinally extending bore into which at least one of the first pin assembly and the second pin assembly is disposed, and wherein the drill/driver is operable in a screwdriver mode, wherein a rotary output is provided to an output spindle and the second follower is spaced apart from the bypass profile, and a drill mode, wherein a rotary output is provided to the output spindle and the second follower is engaged to the bypass profile to inhibit rotation of the ring gear.

16. The drill/driver of claim 15, wherein the first pin assembly is disposed in the first longitudinally extending bore and wherein the transmission sleeve includes a second longitudinally extending bore into which the second pin assembly is disposed.

17. The drill/driver of claim 16, wherein the clutch profile is disposed radially inwardly of the bypass profile.

18. The drill/driver of claim 15, further comprising a mode setting switch and a torque setting switch, wherein the clutch bypass includes a third pin assembly having a third follower, a third pin member, a fourth spring, which biases the third follower away from the bypass profile, and a fifth spring, which biases the third follower away from the third pin member, the mode setting switch being operable for setting the drill/driver into a first mode, wherein a rotary output is provided to an output spindle, and a second mode, wherein a rotary and percussive output is provided to the output spindle, the torque setting switch being operable for adjusting a force exerted by the first pin assembly onto the clutch profile, and wherein the second follower is moved into contact with the bypass profile when the drill/driver is operated in the second mode.

19. The drill/driver of claim 18, wherein the third follower is moved into contact with the bypass profile when the torque setting switch is set to a predetermined torque setting.

20. The drill/driver of claim 18, wherein the mode setting switch is a rotary switch.

21. The drill/driver of claim 15, wherein the drill/driver is further operable in a hammer drill mode, wherein a rotary and percussive output is provided to the output spindle and the second follower is engaged to the bypass profile to inhibit rotation of the ring gear.

* * * * *